(12) United States Patent
Kayama et al.

(10) Patent No.: US 8,537,650 B2
(45) Date of Patent: Sep. 17, 2013

(54) OPTICAL READ/WRITE APPARATUS

(75) Inventors: Hiroshi Kayama, Osaka (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/609,557

(22) Filed: Sep. 11, 2012

(65) Prior Publication Data

US 2013/0088948 A1    Apr. 11, 2013

(30) Foreign Application Priority Data

Oct. 7, 2011  (JP) .................................. 2011-222490

(51) Int. Cl.
*G11B 7/00*    (2006.01)

(52) U.S. Cl.
USPC ................ 369/112.03; 369/44.38; 369/44.35; 369/44.29

(58) Field of Classification Search
None
See application file for complete search history.

(56) References Cited

U.S. PATENT DOCUMENTS

| 4,935,913 A | 6/1990 | Shinoda |
| 5,808,991 A | 9/1998 | Inoue |
| 6,721,255 B1 | 4/2004 | Gushima et al. |

FOREIGN PATENT DOCUMENTS

| JP | 59-113509 | 6/1984 |
| JP | 08-249660 A | 10/1988 |
| JP | 63-249941 A | 10/1988 |
| JP | 05-073913 A | 3/1993 |
| JP | 08-255345 A | 10/1996 |
| JP | 09-128758 A | 5/1997 |

*Primary Examiner* — Van Chow

(74) *Attorney, Agent, or Firm* — Rennar, Otto, Boisselle & Sklar, LLP

(57) ABSTRACT

An optical read/write apparatus as an embodiment of the present invention includes: a light-splitting element configured to split a light beam emitted from a light source into multiple light beams including a write beam and a read beam; an optical system configured to converge the write and read beams onto the same track on an optical storage medium; a photodetector including a light receiving element configured to detect the read beam reflected from the optical storage medium and output an electrical signal; and a divider configured to generate a read signal by dividing the signal detected by the light receiving element by a signal that represents a write modulated component and that is obtained by detecting a part of the light beam emitted from the light source.

9 Claims, 28 Drawing Sheets

RECORDING TRACK
(LAND PORTION)

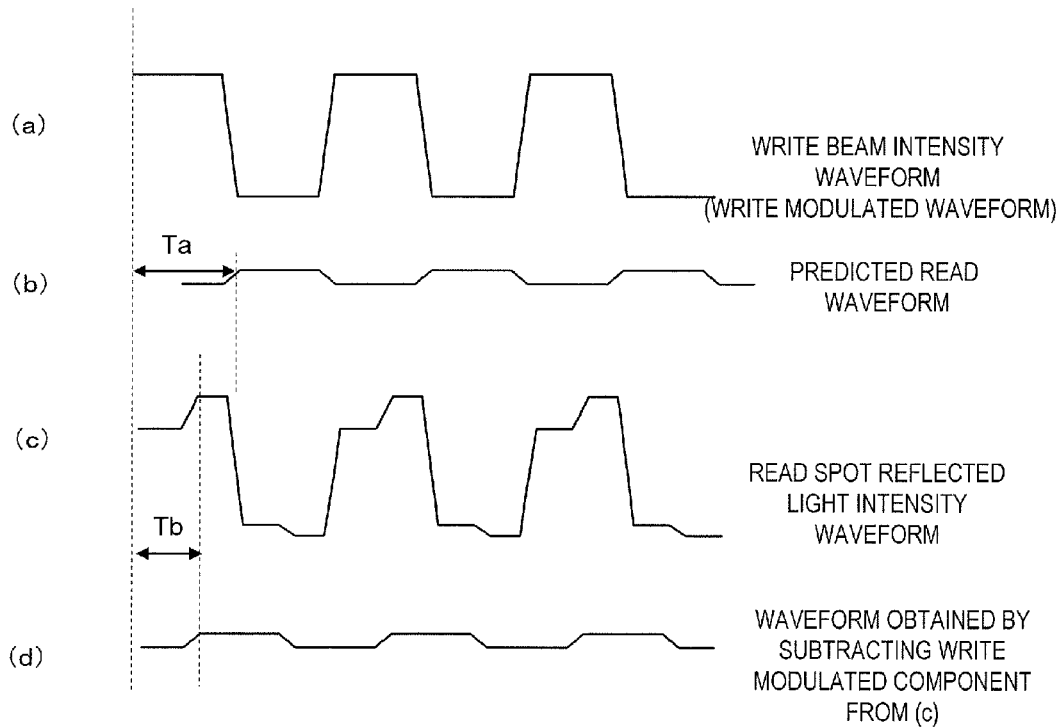
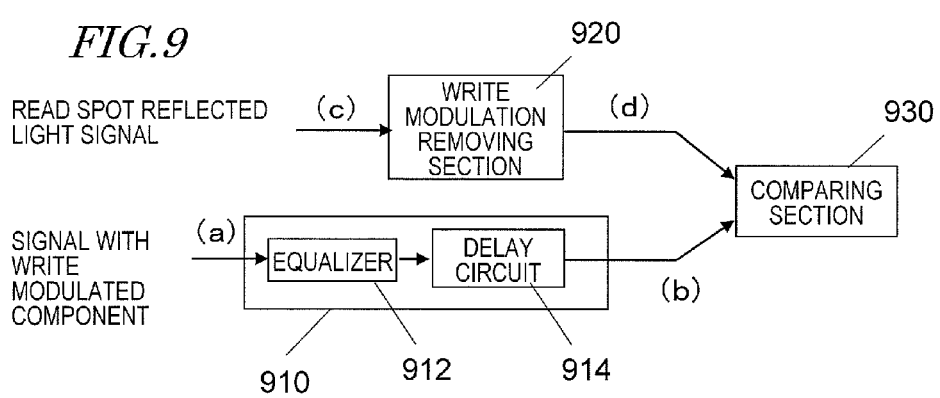

(a) WRITE MODULATED WAVEFORM (b) PREDICTED READ WAVEFORM (c) FIRST SUB-PHOTODIODE'S OUTPUT WAVEFORM (d) (a) + (b)

| TEMPERATURE (°C) | LD WAVELENGTH (nm) | SPOT INTERVAL (μm) | TIME DELAY (μs) | TIME DELAY (clock) |
|---|---|---|---|---|
| 0 | 405.0 | 99.59 | 20.3245 | 1341.4 |
| 25 | 406.7 | 100.00 | 20.4082 | 1346.9 |
| 50 | 408.3 | 100.41 | 20.4918 | 1352.5 |
| 75 | 410.0 | 100.82 | 20.5754 | 1358.0 |

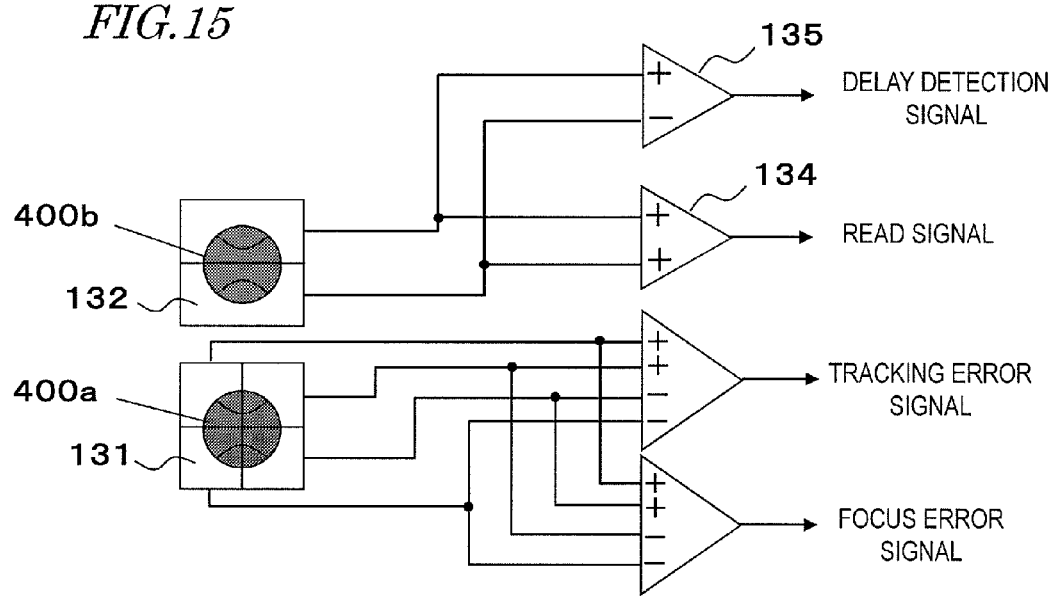
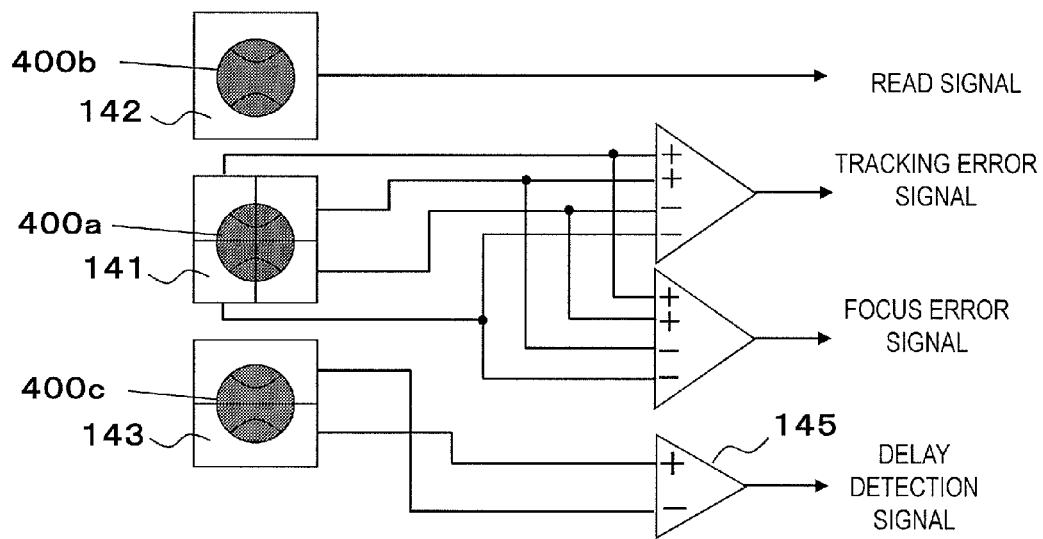

RECORDING TRACK
(LAND PORTION)

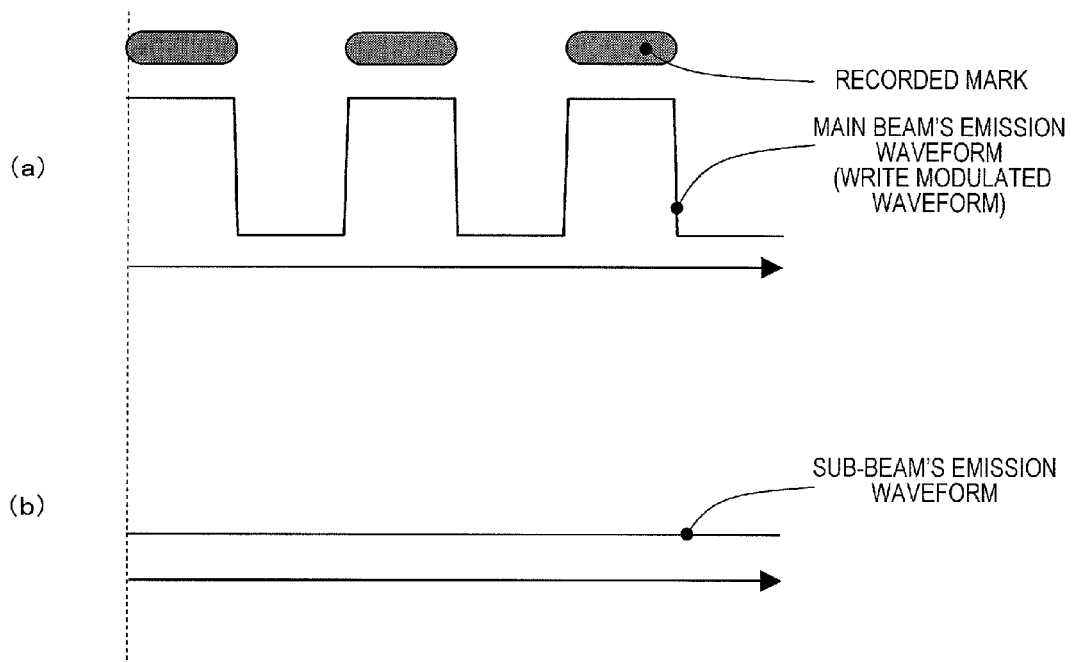
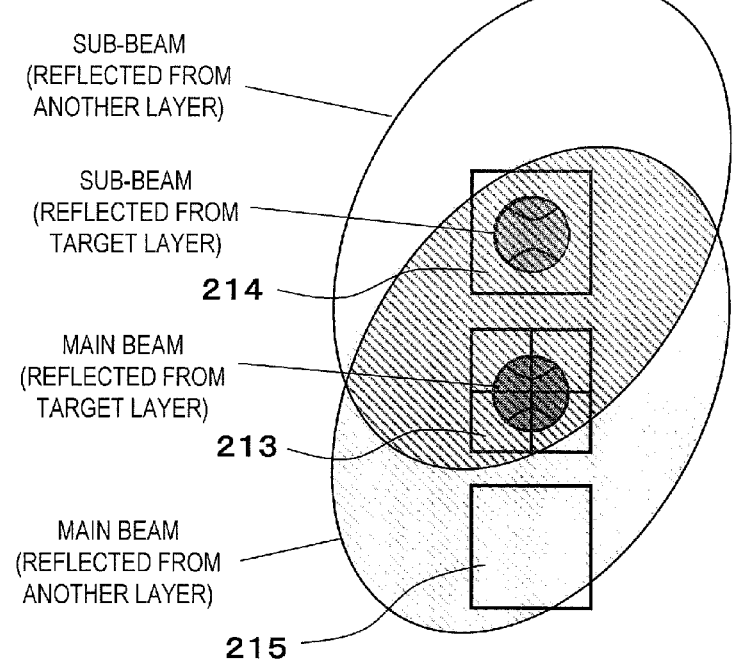

OPTICAL READ/WRITE APPARATUS

BACKGROUND OF THE INVENTION

1. Field of the Invention

The present disclosure relates to an optical read/write apparatus that reads and writes information from/on an optical storage medium such as an optical tape, an optical disc or an optical card. More particularly, the present disclosure relates to an apparatus that carries out verification on data being written on an optical storage medium.

2. Description of the Related Art

Recently, the size of digital data to process has been rising steeply year by year as the resolutions of video data and still picture data have been tremendously increased and as increasing numbers of paper media have been converted into electronic ones. Meanwhile, so-called "crowd computing" technologies that allow people to use various kinds of applications and services via servers and storage systems on some network have become more and more popular nowadays. According to such crowd computing technologies, as a huge number of users save various kinds of data on that storage system on the network, the amount of data accumulated there should keep on skyrocketing from now on.

In the meantime, as regulations have been established one after another with regard to the duty of preserving such a huge amount of data saved, it should also be increasingly important to devise a method for saving that enormous amount of data as securely and as reliably as possible.

An apparatus that writes data of such a huge size optically on a storage medium must perform the operation of seeing if signal marks have been recorded just as intended on the optical storage medium in order to increase the reliability of writing. Such an operation will be referred to herein as a "verify operation".

A known read/write apparatus that reads and writes data from/on an optical storage medium such as a write-once or rewritable optical disc reads data that has been just written and compares the data that has been read to the data to write in order to detect an error, if any, lest the write operation should fail due to a defect on the storage medium.

Such a verify operation is often performed in a unit at which a constant write or transfer rate can be maintained, not after everything has been written. That is to say, every time the disc has turned to a predetermined degree, the write operation is suspended, a track jump is made to return to the previous location, that portion on which data has just been written is scanned to detect any error, and then a track jump is made once again to move to a different area and write the next data there. And this series of operations is carried out over and over again by the read/write apparatus. That is why although reliability can be certainly ensured in this way for the data that has been written, it takes a longer time to get the write operation done.

If any error is detected when the data that has just been written is read, then the write operation is retried on another area, not the area on which the write error has occurred. On an optical disc, a set of data and its ID information are stored on the basis of a unit area called a "sector". Thus, the data that has been written with an error on a sector is rewritten on another sector (which will be referred to herein as a "replacement sector"). A known read/write apparatus that makes such data correction is disclosed in Japanese Laid-Open Patent Publication No. 59-113509 (which will be referred to herein as "Patent Document No. 1" for convenience sake), for example.

Lately, as candidate read/write apparatuses that can save and archive data for a long time in order to meet the rising demand for storing a huge size of data with as high reliability as possible, proposed are an apparatus that uses a so-called "optical tape", which is a kind of an optical storage medium in a tape shape, and an apparatus that handles a combination of multiple optical disc drives at the same time. Such a read/write apparatus to process a huge size of data should not only write and transfer data at sufficiently high rates but also keep the reliability of the written data as high as possible.

Nevertheless, for a storage medium with a low degree of random accessibility such as the tape medium, it is difficult to increase the write rate as long as such a method of writing data and checking the data just written time-sequentially over and over again is adopted as in the known optical disc drive described above.

Thus, to meet such a demand, a so-called "DRAW (direct read after write)" technique for performing a write operation and a read operation for verification purposes at the same time has been proposed. A known read/write apparatus that adopts such a DRAW technique is disclosed in Japanese Laid-Open Patent Publication No. 63-249941 (which will be referred to herein as "Patent Document No. 2" for convenience sake), for example.

The apparatus disclosed in Patent Document No. 2 makes a diffraction grating split the light that has been emitted from a light source into a write beam and two read beams and irradiates the same track on a storage medium with those three beams. As a result, the write beam forms a light beam spot as a write beam spot on one track and the two read beams form two light beam spots as read beam spots on the same track, thereby getting the DRAW operation done (i.e., writing data and reading the data that has just been written in parallel). By adopting such a technique, even an apparatus that processes a storage medium with big storage capacity but a low degree of random accessibility such as an optical tape or an apparatus including multiple optical disc drives in combination can also perform the verify operation while continuing the write operation. Consequently, a system that achieves even higher write and transfer rate and ensures a good deal of reliability is realized.

To stabilize the read operation to be performed by such a read/write apparatus using a read beam spot formed by the light that has been emitted from one light source while writing data with a write beam spot left by the same light source, Japanese Laid-Open Patent Publication No. 5-73913 (which will be referred to herein as "Patent Document No. 3" for convenience sake) proposes carrying out an automatic gain control (AGC) on the output read signal based on a write signal supplied from an LD modulator. Likewise, Japanese Laid-Open Patent Publication No. 8-249660 (which will be referred to herein as "Patent Document No. 4" for convenience sake) proposes switching the gain of the output read signal based on a write beam spot modulation signal supplied from a microprocessor unit (MPU).

Furthermore, Japanese Laid-Open Patent Publication No. 8-255345 (which will be referred to herein as "Patent Document No. 5" for convenience sake) proposes an apparatus that performs a DRAW operation by using reflected light beams that have left two read beam spots before and after a write beam spot on a track in order to deal with a variation in the level of a verify signal due to a defect on a given storage medium, for example. That apparatus includes a circuit that performs either division or subtraction on a signal obtained by getting a signal, from which a write modulated component has been removed by changing the gain of a read signal representing the reflected light that has left a first read beam spot moving ahead of the write beam spot, delayed for a predetermined amount of time by a delay circuit and on a signal from which a write modulated component has been removed by changing the gain of a read signal representing the reflected light that has left a second read beam spot moving behind the write beam spot. Patent Document No. 5 proposes minimizing the influence of any defect on a storage medium by performing the verify operation based on the output of such a circuit. And Patent Document No. 5 also proposes that the delay time in such a situation be set to be d/v, where d is the interval between the two read beam spots and v is the relative velocity of a light beam spot with respect to the storage medium.

According to the technique disclosed in Patent Document No. 2, a read signal is obtained by calculating the difference between the two signals representing the reflected light beams that have left the two read beam spots. On the other hand, according to the techniques disclosed in Patent Document Nos. 3 to 5, a read signal is obtained by dividing a signal representing the reflected light that has left the read beam spot moving behind the write beam spot by the write modulated signal to be input to the light source (i.e., by changing the gain). With any of these techniques, however, only a read signal of poor signal quality can be obtained and it is difficult to get the verify operation done accurately as will be described later.

Also, according to these known techniques, if any operating environment parameter such as the output power or the temperature changes, then the time delay between two signals to compare also changes, thus making it impossible to perform the comparison and correlation operations with good stability.

Furthermore, if the DRAW technique is applied to a storage medium with multiple information storage layers, the quality of the read signal will be debased due to the adverse influence of light that has been reflected from a storage layer other than the target one, from/on which data needs to be read or written.

Thus, an embodiment of the present invention provides an optical pickup and optical read/write apparatus that can obtain a good read signal by removing such a write modulated component from the read signal.

Another embodiment of the present invention provides an optical pickup and optical read/write apparatus that can get the comparison and correlation operations done with stability by obtaining a good predicted waveform even if the time delay between a signal representing the write modulated component and a signal representing the intensity of the read beam has varied.

Still another embodiment of the present invention provides an optical pickup and optical read/write apparatus that can reduce the adverse influence of such light that has been reflected from a non-target storage layer when the DRAW technique is applied to a storage medium with multiple storage layers.

SUMMARY OF THE INVENTION

An optical read/write apparatus as an embodiment of the present invention can write data on a track on an optical storage medium and read the data that has just been written on the track in parallel. The apparatus includes: a light source; an optical modulator configured to modulate the emission power of the light source according to the data to be written; a light-splitting element configured to split a light beam emitted from the light source into multiple light beams including a write beam and a read beam; an optical system configured to converge the write and read beams onto the same track on the optical storage medium so that while a write operation is being performed, the same location on the optical storage medium is scanned with the write beam before being scanned with the read beam; a photodetector including a light receiving element configured to detect the read beam reflected from the optical storage medium and output an electrical signal; and a divider configured to generate a read signal by dividing the signal detected by the light receiving element by a signal that represents a write modulated component of the light beam and that is obtained by detecting a part of the light beam emitted from the light source.

In one embodiment, the light-splitting element is a diffraction grating.

In another embodiment, the optical read/write apparatus further includes a front-monitor diode configured to output the signal representing the write modulated component of the light beam by detecting that part of the light beam emitted from the light source, and the divider generates the read signal by dividing the output of the light receiving element by the output of the front-monitor diode.

In still another embodiment, if the light receiving element is called a first light receiving element, the photodetector further includes a second light receiving element configured to output a signal representing the write modulated component of the light beam by detecting a part of the light beam that has been split by the light-splitting element and reflected from the optical storage medium, and the divider generates the read signal by dividing the output of the first light receiving element by the output of the second light receiving element.

In yet another embodiment, if the read beam is called a first read beam and if the light receiving element is called a first light receiving element, the light-splitting element splits the light beam emitted from the light source into multiple light beams including the write beam, the first read beam and a second read beam. The optical system is configured to converge the write beam and the first and second read beams onto the same track on the optical storage medium so that while a write operation is being performed, the same location on the optical storage medium is scanned with the write beam before being scanned with the first read beam and also scanned with the second read beam before being scanned with the write beam. The photodetector includes a second light receiving element configured to detect the second read beam reflected from the optical storage medium and output an electrical signal. And the divider generates the read signal by dividing the output of the first light receiving element by the output of the second light receiving element.

An optical read/write apparatus as another embodiment of the present invention can write data on a track on an optical storage medium and read the data that has just been written on the track in parallel. The apparatus includes: a light source; an optical modulator configured to provide the light source with a write modulation signal that modulates the emission power of the light source according to the data to be written; a light-splitting element configured to split a light beam emitted from the light source into multiple light beams including a write beam and a read beam; an optical system configured to converge the write and read beams onto the same track on the optical storage medium so that while a write operation is being performed, the same location on the optical storage medium is scanned with the write beam before being scanned with the read beam; a photodetector including a light receiving element configured to detect the read beam reflected from the optical storage medium and output an electrical signal; a waveform predicting section configured to generate a predicted read waveform by performing processing that includes the step of delaying either the waveform of the write modulation signal or a waveform representing the write modulated component of the light beam that has been modulated with the write modulation signal; a comparing section configured to compare a waveform based on the output of the light receiving element to the predicted read waveform, thereby determining whether or not the data has been written successfully; and a delay detecting section configured to detect the time delay of a waveform representing the output signal of the light receiving element with respect to either the waveform of the write modulation signal or the waveform representing the write modulated component of the light beam that has been modulated with the write modulation signal, thereby controlling the amount of delay caused by the waveform predicting section based on the time delay detected.

In one embodiment, the waveform predicting section includes an equalizer configured to output either the write modulation signal or the signal representing the write modulated component after having changed the signal's level and a delay circuit configured to delay the output of the equalizer. The delay detecting section varies the amount of delay caused by the delay circuit according to the time delay detected.

In this particular embodiment, the optical read/write apparatus further includes a temperature sensor, and the delay detecting section detects the time delay based on the output of the temperature sensor.

In another embodiment, the light receiving element is divided into at least two photosensitive areas that are arranged in a direction corresponding to the track direction of the optical storage medium, and the delay detecting section detects the time delay based on a differential output between the two photosensitive areas.

In still another embodiment, if the light receiving element is called a first light receiving element, the photodetector further includes a second light receiving element configured to output a signal representing the write modulated component of the light beam by detecting a part of the light beam that has been split by the light-splitting element and reflected from the optical storage medium. The second light receiving element is divided into at least two photosensitive areas that are arranged in the direction corresponding to the track direction of the optical storage medium. The delay detecting section detects the time delay based on a differential output between the two photosensitive areas.

In yet another embodiment, if the read beam is called a first read beam and if the light receiving element is called a first light receiving element, the light-splitting element splits the light beam emitted from the light source into multiple light beams including the write beam, the first read beam and a second read beam. The optical system is configured to converge the write beam and the first and second read beams onto the same track on the optical storage medium so that while a write operation is being performed, the same location on the optical storage medium is scanned with the write beam before being scanned with the first read beam and also scanned with the second read beam before being scanned with the write beam. The photodetector further includes second and third light receiving elements configured respectively to detect the second read beam and the write beam that have been reflected from the optical storage medium and then each output an electrical signal. The first light receiving element is divided into two or more photosensitive areas including at least first and second photosensitive areas. The second light receiving element is divided into two or more photosensitive areas including at least third and fourth photosensitive areas. The first photosensitive area, the second photosensitive area, the third light receiving element, the third photosensitive area and the fourth photosensitive area are arranged in this order in a direction corresponding to the track direction of the optical storage medium. And the delay detecting section detects the time delay based on a differential signal between a signal representing the sum of the signals of the first and fourth photosensitive areas and a signal representing the sum of the signals of the second and third photosensitive areas.

In yet another embodiment, if test data to detect the amount of delay has been written on the optical storage medium, the delay detecting section detects the time delay based on a time lag between a signal representing the write beam reflected from an area where the test data is stored and a signal representing the read beam reflected from the area where the test data is stored.

In this particular embodiment, the optical read/write apparatus further includes a control section configured to instruct the optical modulator to write the test data on the optical storage medium with the write beam before the time delay is detected by the delay detecting section.

In another embodiment, the optical read/write apparatus further includes a control section configured to instruct the optical modulator not to emit the write beam with write power at a time when the test data is scanned with the read beam while the time delay is being detected by the delay detecting section.

An optical read/write apparatus as still another embodiment of the present invention can write data on a track on an optical storage medium that has multiple storage layers and read the data that has just been written on the track in parallel. The apparatus includes: a first light source configured to emit a write beam; a second light source configured emit a read beam; an optical modulator configured to modulate the emission power of the first light source according to the data to be written; an optical system configured to converge the write and read beams onto the same track on the optical storage medium so that while a write operation is being performed, the same location on the optical storage medium is scanned with the write beam before being scanned with the read beam; a photodetector including a light receiving element configured to detect the read beam reflected from the optical storage medium and configured to output an electrical signal; and an arithmetic unit configured to subtract a signal that is based on a signal obtained by detecting a part of the write beam that has been emitted from the first light source and then reflected from one of the storage layers other than a target storage layer to write data on, from the output signal of the light receiving element, thereby reducing modulated components produced by stray light that has come from the non-target storage layer from the output of the light receiving element.

In one embodiment, if the light receiving element is called a first light receiving element, the photodetector further includes a second light receiving element arranged to receive a part of the write beam reflected from the non-target storage layer but not to receive the read beam reflected from the target storage layer. And the arithmetic unit subtracts the output signal of the second light receiving element from the output signal of the first light receiving element.

In another embodiment, if the light receiving element is called a first light receiving element, the photodetector further includes a second light receiving element configured to detect the write beam reflected from the optical storage medium and output an electrical signal. The arithmetic unit subtracts a signal that is obtained by adjusting the level of the output signal of the second light receiving element, from the output signal of the first light receiving element.

An optical read/write apparatus as yet another embodiment of the present invention can write data on a track on an optical storage medium that has multiple storage layers and read the data that has just been written on the track in parallel. The apparatus includes: a first light source configured to emit a write beam; a second light source configured to emit a read beam; an optical modulator configured to provide the first light source with a write modulation signal that modulates the emission power of the first light source according to the data to be written; an optical system configured to converge the write and read beams onto the same track on the optical storage medium so that while a write operation is being performed, the same location on the optical storage medium is scanned with the write beam before being scanned with the read beam; a photodetector including a light receiving element configured to detect the read beam reflected from the optical storage medium and output an electrical signal; a waveform predicting section configured to generate a predicted read waveform by performing processing that includes the step of delaying either the waveform of the write modulation signal or a waveform representing the write modulated component of the light beam that has been modulated with the write modulation signal; a comparing section configured to compare a waveform based on the output of the light receiving element to the predicted read waveform, thereby determining whether or not the data has been written successfully; and a delay detecting section configured to detect the time delay of a waveform representing the output signal of the light receiving element with respect to either the waveform of the write modulation signal or the waveform representing the write modulated component of the light beam that has been modulated with the write modulation signal, thereby controlling the amount of delay caused by the waveform predicting section based on the time delay detected.

In one embodiment, the waveform predicting section includes an equalizer configured to output either the write modulation signal or the signal representing the write modulated component after having changed the signal's level and a delay circuit configured to delay the output of the equalizer, and the delay detecting section varies the amount of delay caused by the delay circuit according to the time delay detected.

In another embodiment, if test data to detect the amount of delay has been written on the optical storage medium, the delay detecting section detects the time delay based on a time lag between a signal representing the write beam reflected from an area where the test data is stored and a signal representing the read beam reflected from the area where the test data is stored.

In still another embodiment, before the time delay is detected by the delay detecting section, the test data is written on the optical storage medium with the write beam.

In yet another embodiment, the optical read/write apparatus further includes a control section configured to instruct the optical modulator not to emit the write beam with write power at a time when the test data is scanned with the read beam while the time delay is being detected by the delay detecting section.

According to an embodiment of the present invention, it is possible to perform the verify operation with stability while minimizing the influence of a write modulation waveform on the output signal representing the reflected light that has left a read spot.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 8 shows a time lag between a write modulated waveform and a waveform representing the intensity of reflected light that has left a read spot.

FIG. 9 is a block diagram illustrating an exemplary configuration for predicting and comparing a waveform.

FIG. 15 illustrates a first exemplary configuration for a photodetector that generates a delay detection signal according to the second embodiment.

FIG. 16 illustrates a second exemplary configuration for a photodetector that generates a delay detection signal according to the second embodiment.

FIG. 23 shows exemplary waveforms of main and sub-beams emitted according to the third embodiment.

FIG. 24 illustrates an exemplary configuration for a photodetector according to the third embodiment.

DETAILED DESCRIPTION OF PREFERRED EMBODIMENTS

Figure 1:
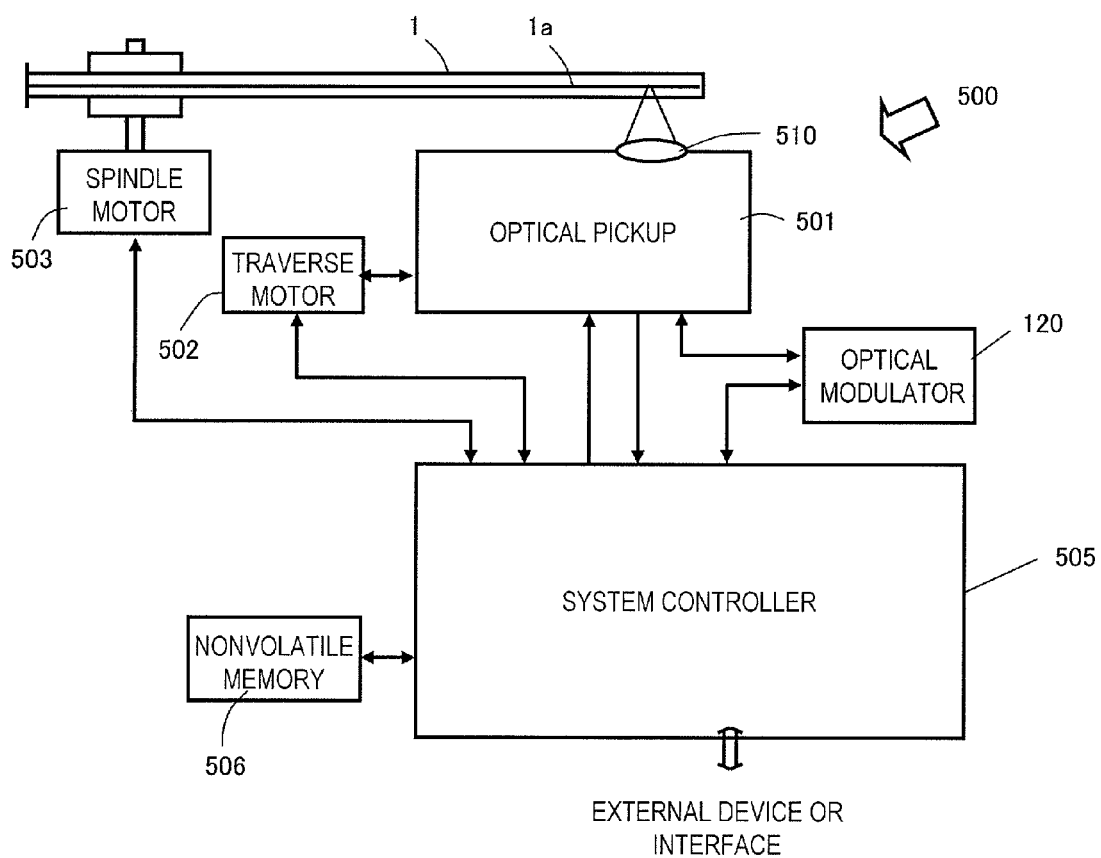
FIG. 1 is a block diagram illustrating an exemplary configuration for an optical read/write apparatus 500 as a first embodiment of the present invention.

Various embodiments of the present invention provide an optical read/write apparatus that writes data on an optical storage medium and reads the data that has just been written in parallel, thereby determining whether or not the data has been written there successfully, and also provide an optical pickup to be included in such an apparatus. In this description, an "optical storage medium" will refer to a medium on which a mark can be recorded optically when irradiated with a light beam. Examples of optical storage media include optical discs, optical tapes and optical cards. And the light beam is radiated from an "optical pickup" that includes a light source and an optical system that focuses the light beam emitted from the light source onto the optical storage medium. When the optical pickup irradiates an optical storage medium with a light beam, an irradiated portion of the optical storage medium comes to have a different optical property (such as a reflectance) from the other non-irradiated portion of the medium. Such an irradiated portion, of which the optical property has varied, will be referred to herein as a "recorded mark".

In optical storage technologies, data can be read out from an optical storage medium by irradiating the storage medium with a relatively weak light beam with a constant intensity and detecting the light that has been modulated by, and reflected from, the optical storage medium. On a rewritable optical storage medium, a recording material film, from/on which data can be read and written optically, is deposited by evaporation process, for example, on the surface of a base (which may be either a disc or a long film) on which grooves and lands are arranged. In writing data on a rewritable optical storage medium, data is written there by irradiating the optical storage medium with a pulsed light beam, of which the optical power has been changed according to the data to be written, and locally changing the property of the recording material film.

In a recordable or rewritable optical storage medium, when data is going to be written on its recording material film, the recording material film is irradiated with such a light beam, of which the optical power has been modulated as described above, thereby recording an amorphous mark on a crystalline recording material film. Such an amorphous recorded mark is formed there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on an optical storage medium, the light beam needs to maintain a predetermined converging state on a target track. For that purpose, a "focus control" and a "tracking control" are performed. The "focus control" means controlling the position of an objective lens along a normal to the surface of the storage medium so that the focal point (or at least the converging point) of the light beam continues to be located on the target track. On the other hand, the "tracking control" means controlling the position of the objective lens perpendicularly to the track so that the light beam spot continues to be located right on the target track.

In order to perform such a focus control or a tracking control, the focus error or the tracking error are detected based on the light that has been reflected from the optical storage medium and the position of the light beam spot is adjusted so as to reduce the error as much as possible. The magnitudes of the focus error and the tracking error are respectively represented by a "focus error (FE) signal" and a "tracking error (TE) signal", both of which are generated based on the light that has been reflected from the optical storage medium.

Thus, the read/write apparatus generates a focus error signal and a tracking error signal during a read/write operation and carries out a focus control and servo controls based on these signals. And then the apparatus writes data using the writing light beam and reads data using the reading light beam.

Hereinafter, embodiments of the present invention will be described with reference to the accompanying drawings. In the following description, any pair of components shown in multiple drawings and having substantially the same function will be identified by the same reference numeral.

(Embodiment 1)

First of all, an optical read/write apparatus will be described as a first embodiment of the present invention. Before the specific configuration and operation of this embodiment are described, however, it will be described what problems with the related art should be overcome by the optical read/write apparatus of this embodiment.

According to the DRAW technique, in order to realize a simple and low cost optical pickup unit (OPU), structurally it will be beneficial to split the light emitted from a single light source into a read beam and a write beam. In particular, as for a read/write apparatus that performs a DRAW operation on a storage medium such as an optical tape using multiple optical pickups, a configuration for splitting the light emitted from a light source into a write beam and a read beam through a light-splitting element such as a diffraction grating or a hologram element will work fine and contribute to reducing its overall size and cost. If such a configuration is adopted, however, a write modulated component will get superposed on not only the write beam but also the read beam, and therefore, the write modulated component should be canceled in order to obtain a read signal based on the read beam detection signal.

In this description, the "write modulated component" refers herein to a signal component, of which the intensity has been modulated to write data, among various signal components that are included in a signal representing the intensity of a light beam that has been emitted from a light source. The write modulated component has a waveform represented by a "write modulation signal" to be supplied to the light source according to the data to be written. That is why if the write modulation signal is a pulse signal, for example, the write modulated component of the light beam also has a similar pulsed waveform.

Thus, to remove such a write modulated component from the read beam, according to Patent Document No. 2, a differential signal between the detection signals of two read beams that have been split by the diffraction grating is generated as a read signal. However, the read signal that has been generated by such a method has too poor signal quality to get the verify operation done accurately as will be described below.

Figure 35:
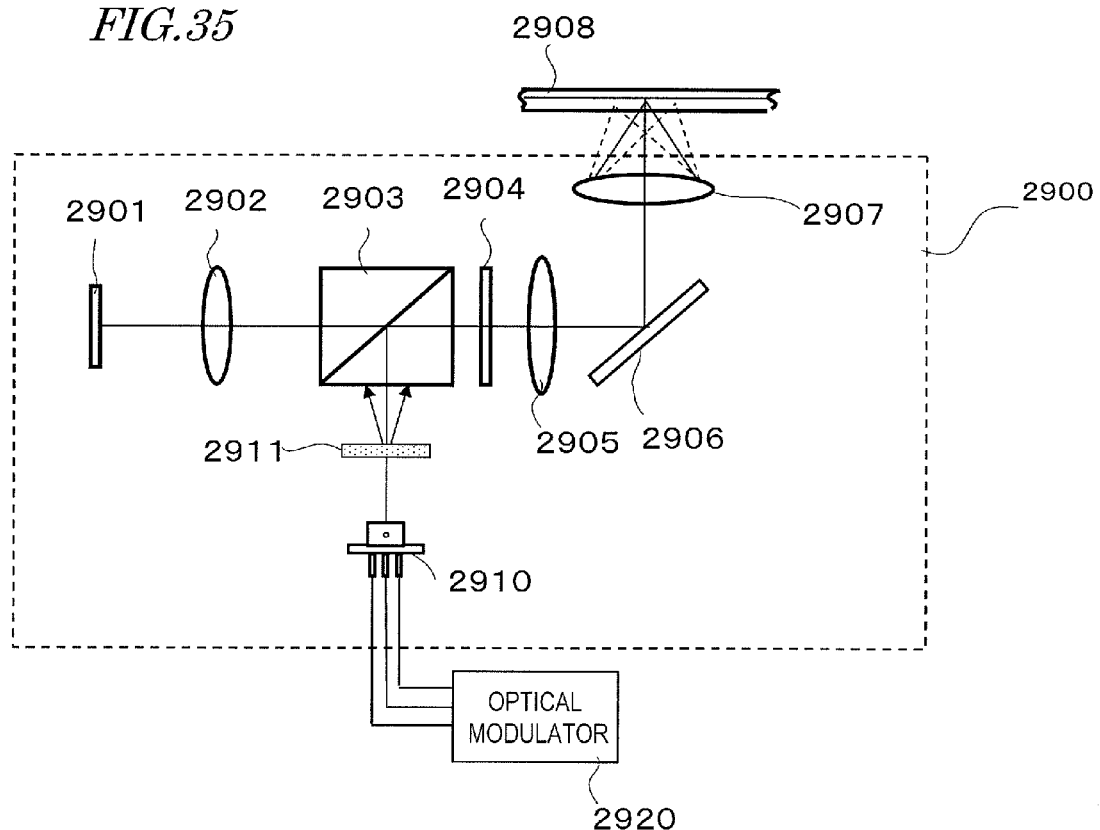
FIG. 35 illustrates a simplified optical configuration for a known optical pickup.

FIG. 35 illustrates a simplified optical configuration for an optical pickup 2900 as disclosed in Patent Document No. 2. This optical pickup 2900 includes a light source 2910, a diffraction grating 2911, a beam splitter 2903, a wave plate 2904, a condenser lens 2905, a mirror 2906, an objective lens 2907 and a photodetector 2901. The light emitted from the light source 2910 gets diffracted by the diffraction grating 2911 and split mainly into a zero-order light beam and ±first-order light beams, which are then condensed by the objective lens 2907, thereby forming three condensed beam spots (that are a main spot and two sub-spots) on the same track on the optical storage medium 2908. To prevent those two sub-spots from erasing or rewriting the signal, the light quantities (or intensities) of the ±first-order light beams are set to be sufficiently lower than that of the zero-order light beam. That is to say, the diffraction efficiency of the diffraction grating 2911 is set to achieve that purpose.

Figure 36:
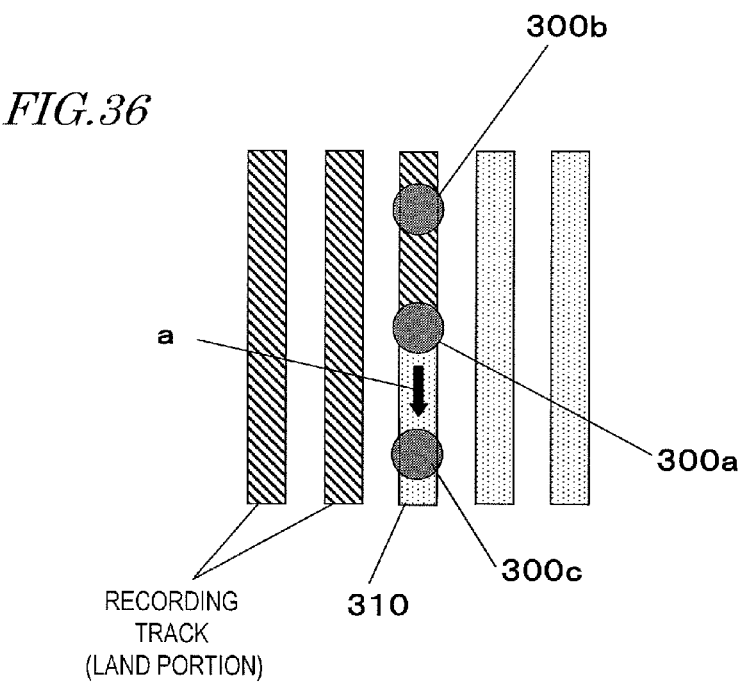
FIG. 36 illustrates the arrangement of light beam spots that are condensed on an optical storage medium by a known optical read/write apparatus.

FIG. 36 illustrates the arrangement of light beam spots that are condensed on the storage layer of the optical storage medium 2908 during a write operation. The main spot 300a formed by the zero-order light beam is a write beam spot, which is used to write data on the optical storage medium 2908. On the other hand, the two sub-spots 300b and 300c formed by the ±first-order light beams are read beam spots, which are used to read the written data. In the following description, the main spot will be sometime referred to herein as a "write spot" and the sub-spots will be sometimes referred to herein as "read spots".

During a write operation, the main spot 300a and the sub-spots 300b and 300c are located on the same track 310. And these spots move on the optical storage medium 2908 in the direction indicated by the arrow a. Actually, however, these light beam spots are fixed with respect to the apparatus and it is the track of the optical storage medium 2908 that rotates or moves. As a result, the respective light beam spots appear to move with respect to the optical storage medium 2908. Such a relative movement of the main spot on a track of the optical storage medium will be referred to herein as "scanning the storage medium with a write beam". In the same way, such a relative movement of the sub-spot, which follows the main spot, on the track of the storage medium will be referred to herein as "scanning the storage medium with a read beam". In performing a DRAW operation, the same location on an optical storage medium is scanned with a write beam before being scanned with a read beam. More specifically, of these two sub-spots, the sub-spot 300b moves behind the write spot 300a to read the recorded mark. That is why its reflected light is affected by the mark that has been recorded with the main spot 300a and has its quantity modulated. Meanwhile, the other sub-spot 300c moves ahead of the main spot 300a, and its reflected light includes no information about the recorded mark. These light beams are reflected from the optical storage medium 1908, transmitted through the optical system shown in FIG. 35, and then detected by the photodetector 2901 shown in FIG. 35.

Figure 37:
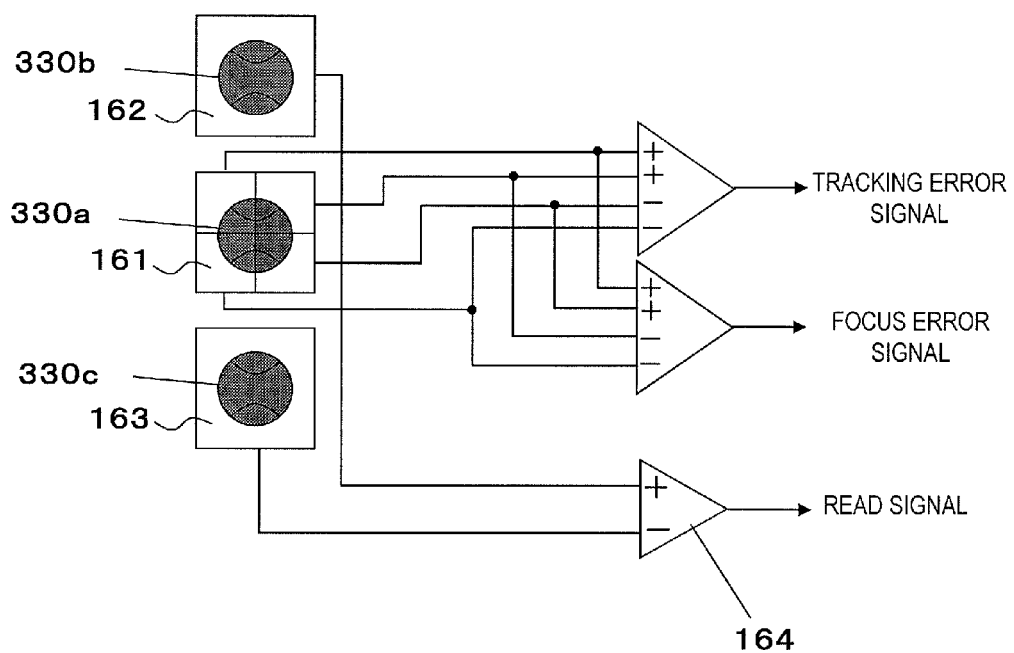
FIG. 37 illustrates a configuration for a photodetector in a known optical read/write apparatus.

FIG. 37 illustrates the arrangement of light receiving elements in the photodetector 2901. The quadruple light receiving element 161 receives the zero-order light beam (i.e., the reflected light 330a that has left the main spot 300a) and outputs an electrical signal representing the quantity of the light received. The magnitude of astigmatism produced by the detector lens 2902 shown in FIG. 35 changes with the degree of defocusing, thereby detecting a focus error signal. The light receiving element 161 also detects a tracking error signal by the push-pull method. On the other hand, the light receiving element s 162 and 163 receive reflected light beams 330b and 330c that have left the sub-spots 300b and 300c, respectively.

In order to record a mark on the optical storage medium 2908, the light source 2910 emits a light beam that has been modulated with the write modulation signal supplied from the optical modulator 2920. Naturally, the read beams that have been emitted from the same light source 2910 have also gone through that modulation. That is why in the reflected light of the sub-spot 300b that moves behind the main spot 300a of the two sub-spots 300b and 300c of the ±first-order light, a modulated component representing a variation in reflectance caused by a recorded mark and a modulated component representing a variation in the quantity of light caused by the optical modulator 2920 (i.e., the write modulated component) are superposed one upon the other. Meanwhile, the other sub-spot 300c moves ahead of the write spot 300a through an unrecorded portion, and therefore, its reflected light has no components modulated by the variation in reflectance caused by the recorded mar but includes only the write modulated component. For that reason, by performing a differential arithmetic operation on the two signals representing the intensities of those two sub-beams, a read signal (i.e., a monitor signal for verification purposes) can be obtained.

Figure 38:
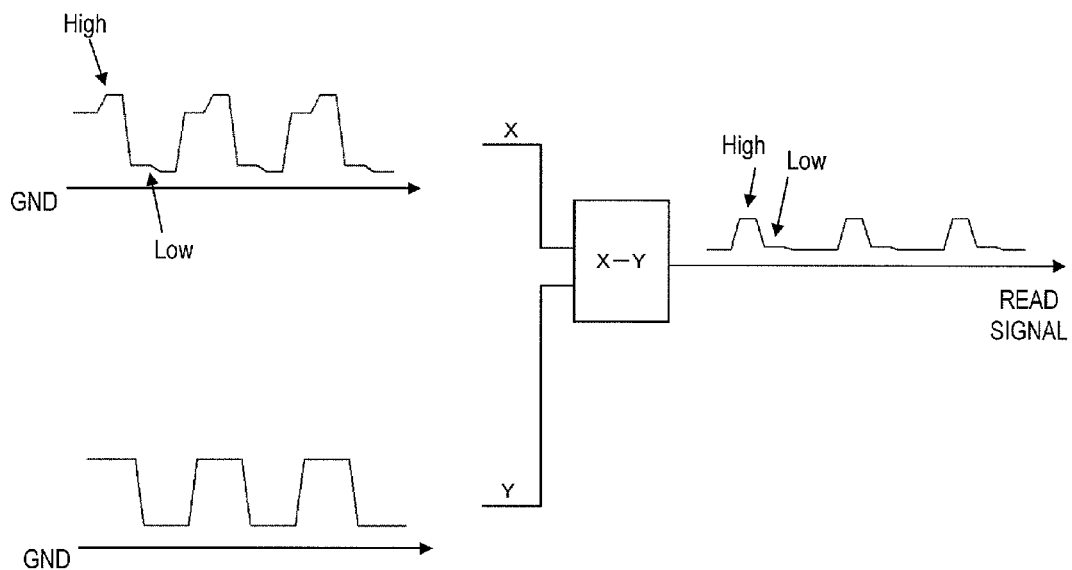
FIG. 38 illustrates how a read signal is generated in principle by a known optical read/write apparatus.

FIG. 38 shows how to detect a read signal in principle by the DRAW technique according to Patent Document No. 2. As shown in FIG. 38, a detection signal Y representing the reflected light that has left the sub-spot 300c, consisting essentially of only the write modulated component, is subtracted from a detection signal X representing the reflected light that has left the sub-spot 300b, in which the write modulated component and a recorded mark component have been superposed one upon the other, thereby obtaining a signal X-Y as the read signal. In this manner, the write modulated component is removed from the signal X.

However, the degree of modulation caused by a recorded mark changes depending on whether the write modulated component has High level or Low level. That is why the read signal X-Y comes to have not only portions with large amplitude corresponding to High level portions of the write modulated component but also portions with small amplitude corresponding to Low level portions thereof. That is to say, according to such a method of removing the write modulated components through a differential arithmetic operation as disclosed in Patent Document No. 2, only a read signal of very poor signal quality, including those portions with large amplitude and portions with small amplitude in the same mixture, can be obtained, thus making it difficult to get the verify operation done as intended.

Other methods for removing the write modulated components are disclosed in Patent Documents Nos. 3 to 5. According to those methods, a signal representing a read beam in which write modulated components and recorded mark components are superposed one upon the other is also divided by a write modulation signal supplied to a light source, thereby generating a read signal. Even when such a method is adopted, however, a good read signal cannot be obtained, either, due to some errors resulting from the characteristics of the light source or elements or the delay caused by signal processing.

Figure 39:
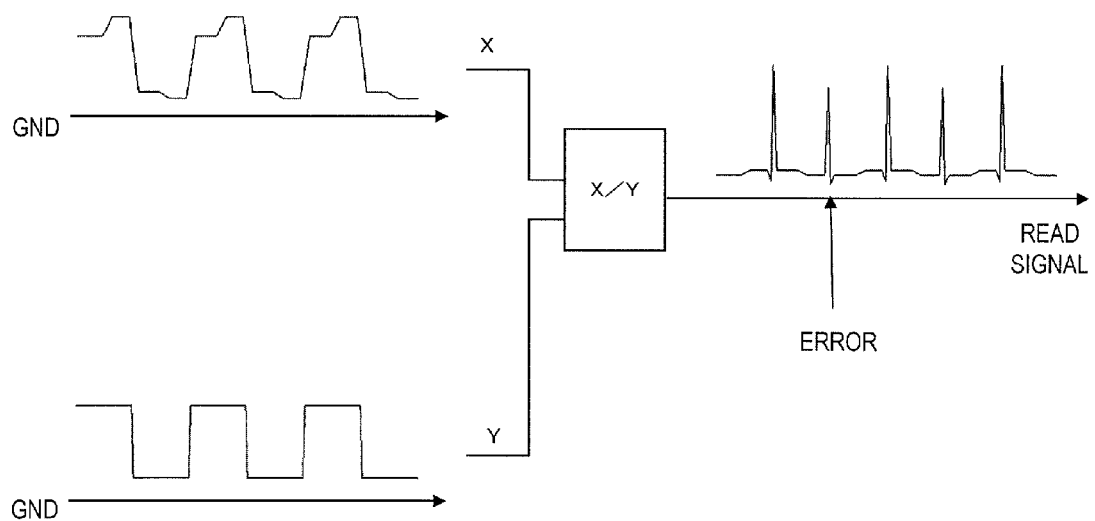
FIG. 39 illustrates how a read signal is generated in principle by another known optical read/write apparatus.

FIG. 39 shows how to detect a read signal in principle by the DRAW technique according to Patent Documents Nos. 3 to 5. As shown in FIG. 39, a signal X/Y, which is obtained by dividing a signal X representing a read beam in which write modulated components and recorded mark components are superposed one upon the other, by a write modulation signal Y supplied to the light source, is generated as a read signal. That is to say, an automatic gain control (or gain switching) is performed on the read beam signal X using the write modulation signal Y. According to such a method, the amplitude of the read signal can be kept roughly constant. However, a waveform representing the intensity of a light beam to be actually output by the light source in response to the write modulation signal and a waveform obtained by getting the read beam that has been reflected from the storage medium detected by the photodetector will contain some errors due to the response characteristics of the respective elements or the delay caused by signal processing. That is why errors are also caused in the read signal X/Y, thus making it difficult to get the verify operation done as intended after all.

The present inventors found these problems inherent in the related art. Thus, the present inventors propose, as an embodiment of the present invention, a novel optical pickup and optical read/write apparatus that can overcome such problems. Hereinafter, the configuration and operation of this embodiment will be described.

1. Configuration of this Embodiment

1.1 Configuration of Optical Read/Write Apparatus

FIG. 1 is a block diagram illustrating an exemplary configuration for an optical read/write apparatus 500 as an embodiment of the present invention. This optical read/write apparatus 500 may be built in a personal computer, an optical storage medium player, an optical storage medium recorder or any other appliance.

The optical read/write apparatus 500 shown in FIG. 1 includes an optical pickup 501, a spindle motor 503 that rotates a given optical storage medium 1, a traverse motor 502 that controls the position of the optical pickup 501, an optical modulator (light source driver) 120 that modulates the output of the light source of the optical pickup 501 according to the data to write, a system controller 505 that controls the operations of these components, and a nonvolatile memory 506. The optical pickup 501 includes a light source that emits a light beam, an objective lens 510 that condenses the light beam to form a light beam spot on a storage layer 1a of the optical storage medium 1, an actuator that drives the objective lens 510, and a photodetector that detects the light reflected from the optical storage medium 1. The light source is typically a semiconductor laser but may also be anything else as long as it can emit a light beam.

Data is optically read out from the optical storage medium 1, and photoelectrically converted by the light receiving element (not shown) of the photodetector of the optical pickup 501 into an electrical signal, which is then passed to the system controller 505. Based on the electrical signal provided by the optical pickup 501, the system controller 505 generates servo signals including a focus error signal and a tracking error signal, and performs various kinds of analog signal processing such as waveform equalization on the read signal, binarization/slicing, and data synchronization.

By using those servo signals generated, the system controller 505 makes the light beam spot, which is formed by the light beam that has been emitted from the light source of the optical pickup 501 on the optical storage medium 1, follow the target track on the optical storage medium 1. The system controller 505 gets a series of control operations, including focus and tracking controls using the objective lens 510, an optical pickup transport control, and a control of the spindle motor, done as digital servo operations. That is to say, the system controller 505 contributes to driving appropriately the actuator (not shown) of the objective lens 510, the traverse motor 502 that moves the optical pickup 501 either inward or outward with respect to the optical storage medium 1, and the spindle motor 503 that rotates the optical storage medium 1. The system controller 505 also controls the optical modulator 120 so that the output of the light source of the optical pickup 501 is modulated according to the data to be written. It should be noted that the system controller 505 and the optical modulator 120 could be implemented as either a semiconductor IC or a combination of a hardware component such as a semiconductor IC and a software program.

The nonvolatile memory 506 stores a software program to be executed by the system controller 505, various parameters, and other kinds of data, which include information about the amount of delay to be caused between a signal representing the reflected light that has left a write spot on the storage layer 1a of the optical storage medium 1 and a signal to be read with a read spot. The system controller 505 generates a predicted read signal based on that information about the amount of delay, and compares a read signal that has been actually generated through detection and arithmetic processing to the predicted read signal, thereby determining whether or not data has been written as intended.

In the configuration shown in FIG. 1, the optical storage medium 1 is supposed to be an optical disc. But the optical storage medium 1 may also be in the shape of a tape or a card. Also, although only one optical pickup 501 is used in this embodiment, the read/write apparatus may also be configured to read and write data in parallel using multiple optical pickups 501.

1.2 Configuration of Optical Pickup

Figure 2:
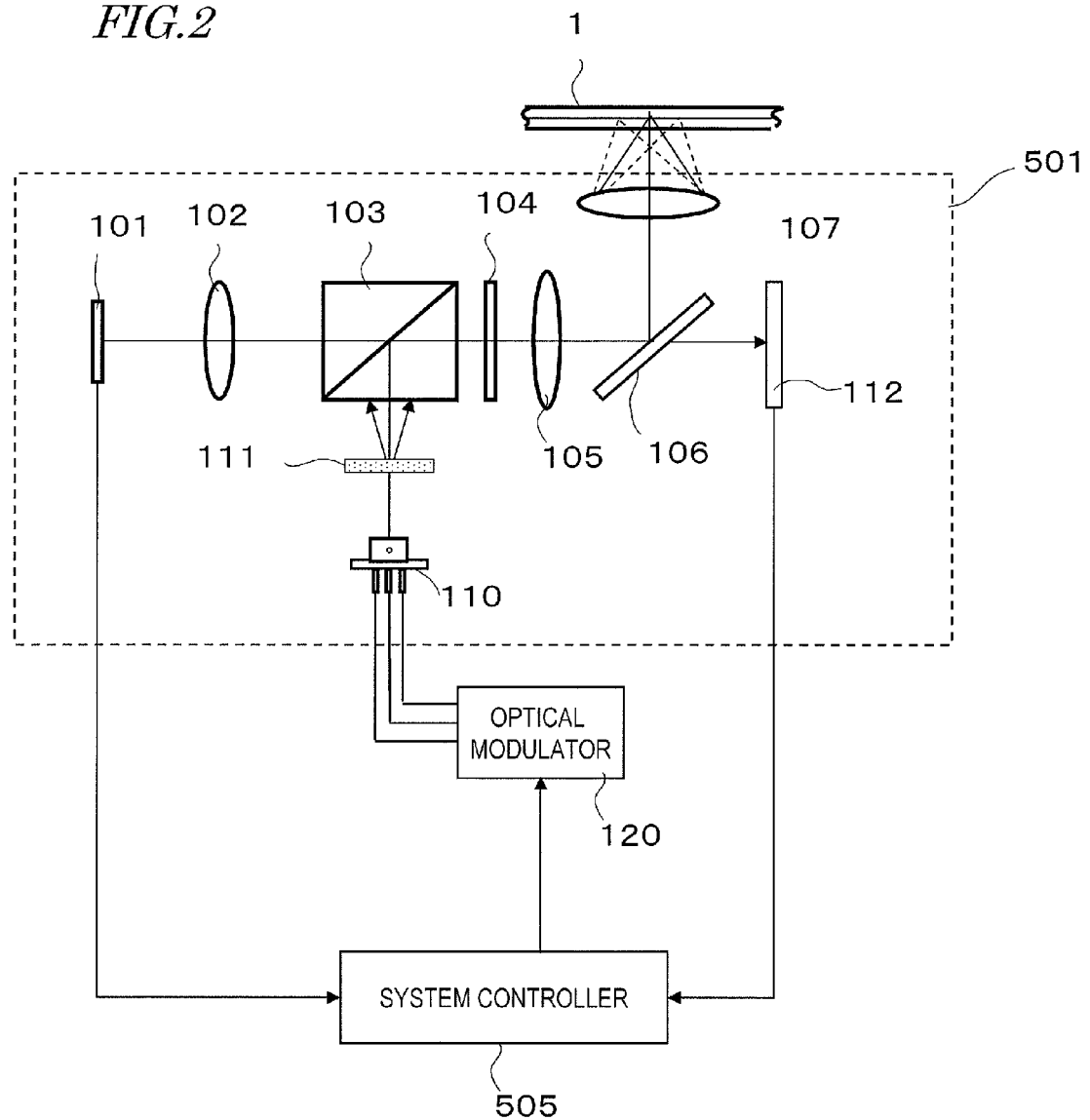
FIG. 2 is a schematic representation illustrating an optical configuration for the optical pickup 501 of the first embodiment.

FIG. 2 illustrates a configuration for the optical system of the optical pickup 501 shown in FIG. 1. As shown in FIG. 2, the optical pickup 501 includes a light source 110, a diffraction grating 111, a beam splitter 103, a wave plate 104, a condenser lens 105, another beam splitter 106, an objective lens 107, a front-monitor diode 112, a detector lens 102, and a photodetector 101. The light that has been emitted from the light source 110 in response to the write modulation signal that has been generated by the optical modulator 120 gets diffracted by the diffraction grating 111 and split mainly into a zero-order light beam and ±first-order light beams, which are then condensed by the objective lens 107, thereby forming three condensed beam spots (that are a main spot and two sub-spots) on the same track on the optical storage medium 1. Although the diffraction grating 111 is used in this embodiment, any other optical element may also be used as long as it can split the incoming light into a write beam and a read beam (such an optical element will be referred to herein as a "light-splitting element"). For example, the diffraction grating 111 may be replaced with a tapered mirror or a prism. In that case, either surface reflected light or transmitted light may be used as a main beam and the light that has been reflected from the inner surface with a taper angle may be used as a sub-beam.

2. Operation of Optical Read/Write Apparatus

Figure 3:
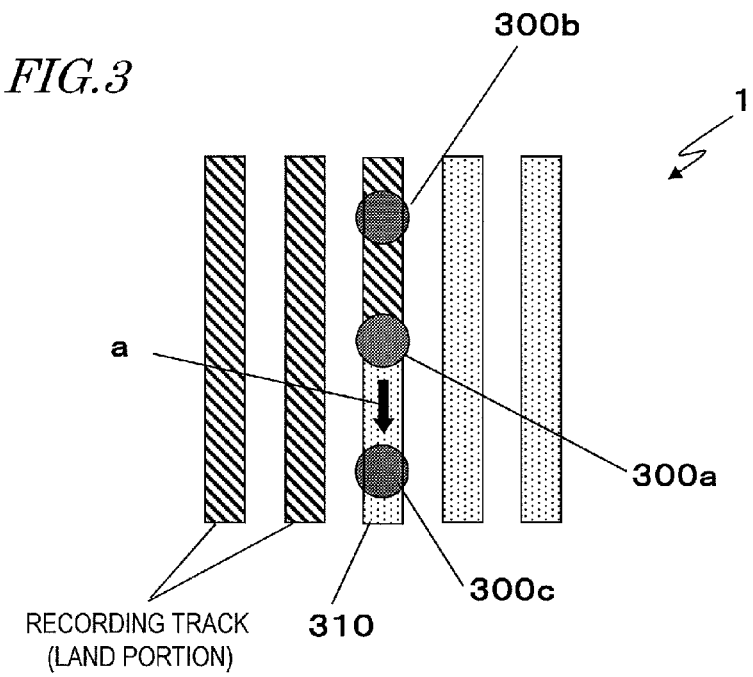
FIG. 3 is a schematic representation illustrating examples of a main spot 300a and two sub-spots 300b, 300c on an optical storage medium according to the first embodiment.

FIG. 3 illustrates an exemplary arrangement of light beam spots that are condensed on the storage layer of the optical storage medium 1 during a write operation. As shown in FIG. 3, the arrangement of light beam spots in this embodiment is the same as the one shown in FIG. 36. The main spot 300a left by the zero-order light beam functions as a write beam spot and is used to write data on the optical storage medium 1. On the other hand, the two sub-spots 300b and 300c left by the ±first-order light beams are light beam spots that are used to read the data that has been written.

During a write operation, the main spot 300a and the sub-spots 300b and 300c are formed on the same track 310 and appear to move in the direction indicated by the arrow a with respect to the optical storage medium 1. In performing a DRAW operation, the same location on the optical storage medium 1 is scanned with the write beam before being scanned with the read beam. During the DRAW operation, of the two sub-spots, the sub-spot 300b follows the main spot 300a, and therefore, is affected by a recorded mark to have the quantity of its reflected light modulated. On the other hand, since the sub-spot 300c goes ahead of the main spot 300a, its reflected light includes no information about a recorded mark. Each of these light beams is reflected by the optical storage medium 1, transmitted through the optical system shown in FIG. 2, and then detected by the photodetector 101. If the running direction of the optical storage medium 1 reverses, then the sub-spots 300b and 300c also change roles with each other.

Figure 4:
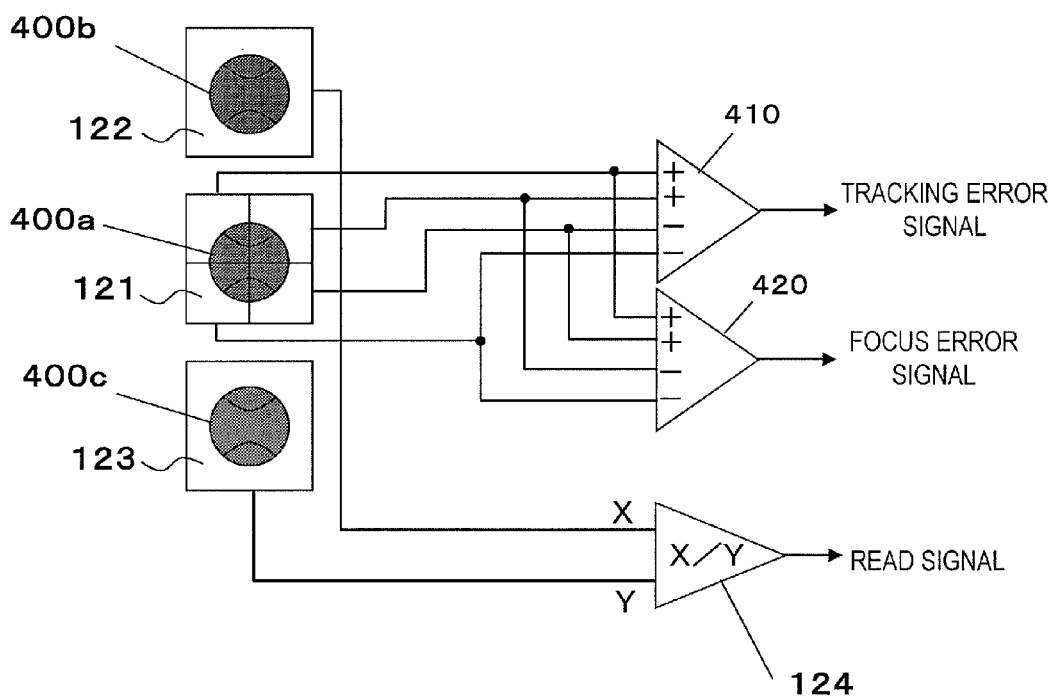
FIG. 4 illustrates a configuration for a photodetector according to the first embodiment.

FIG. 4 illustrates the arrangement of light receiving elements in the photodetector 101, which includes a main light receiving element 121 and first and second sub-light receiving elements 122 and 123. In FIG. 4, the quadruple main light receiving element 121 is arranged to receive the zero-order light beam (i.e., the reflected light 400a that has left the main spot 300a). On the other hand, the first and second sub-light receiving elements 122 and 123 are arranged to receive reflected light 400b that has left the first sub-spot 300b and reflected light 400c that has left the second sub-spot 300c, respectively. Each light receiving element is, for example, composed of a photodiode.

Each of these light receiving elements photoelectrically converts the incident light into an electrical signal representing the quantity of the light received. Based on the output signals of the four photosensitive areas of the main light receiving element 121, arithmetic units 410 and 420 generate a tracking error signal and a focus error signal, respectively. Using the tracking error signal that has been generated based on the output signal of the main light receiving element 121 (i.e., a push-pull signal), the system controller 505 performs a tracking control. In the same way, using the focus error signal that has been generated based on the output signal of the main light receiving element 121, the system controller 505 performs a focus control. The focus error signal shown in FIG. 4 is obtained by taking advantage of the fact that the magnitude of astigmatism produced by the detector lens 102 shown in FIG. 2 changes with the degree of defocusing.

In this embodiment, a divider 124 is provided to divide the output X of the first sub-light receiving element 122 by the output Y of the second sub-light receiving element 123, thereby generating a read signal X/Y. By performing such processing, a read signal of higher quality than a known one can be obtained.

It should be noted that the arithmetic units 410 and 420 and the divider 124 may form parts of either the photodetector 101 or the system controller 505. In the former case, the photodetector 101 generates a tracking error signal, a focus error signal and a read signal and sends them to the system controller 505. In the latter case, the photodetector 101 passes the respective output signals of these light receiving elements to the system controller 505.

In this case, in response to the write modulation signal (LD drive signal) that has been generated by the optical modulator 120, the light source 110 emits light, of which the intensity has been modulated so as to record a mark on the optical storage medium 1. That is why not only the zero-order light beam (write beam) but also the ±first-order light beams that have been emitted from the same light source 110 and diffracted by the diffraction grating 111 are both affected by this intensity modulation.

Figure 5:
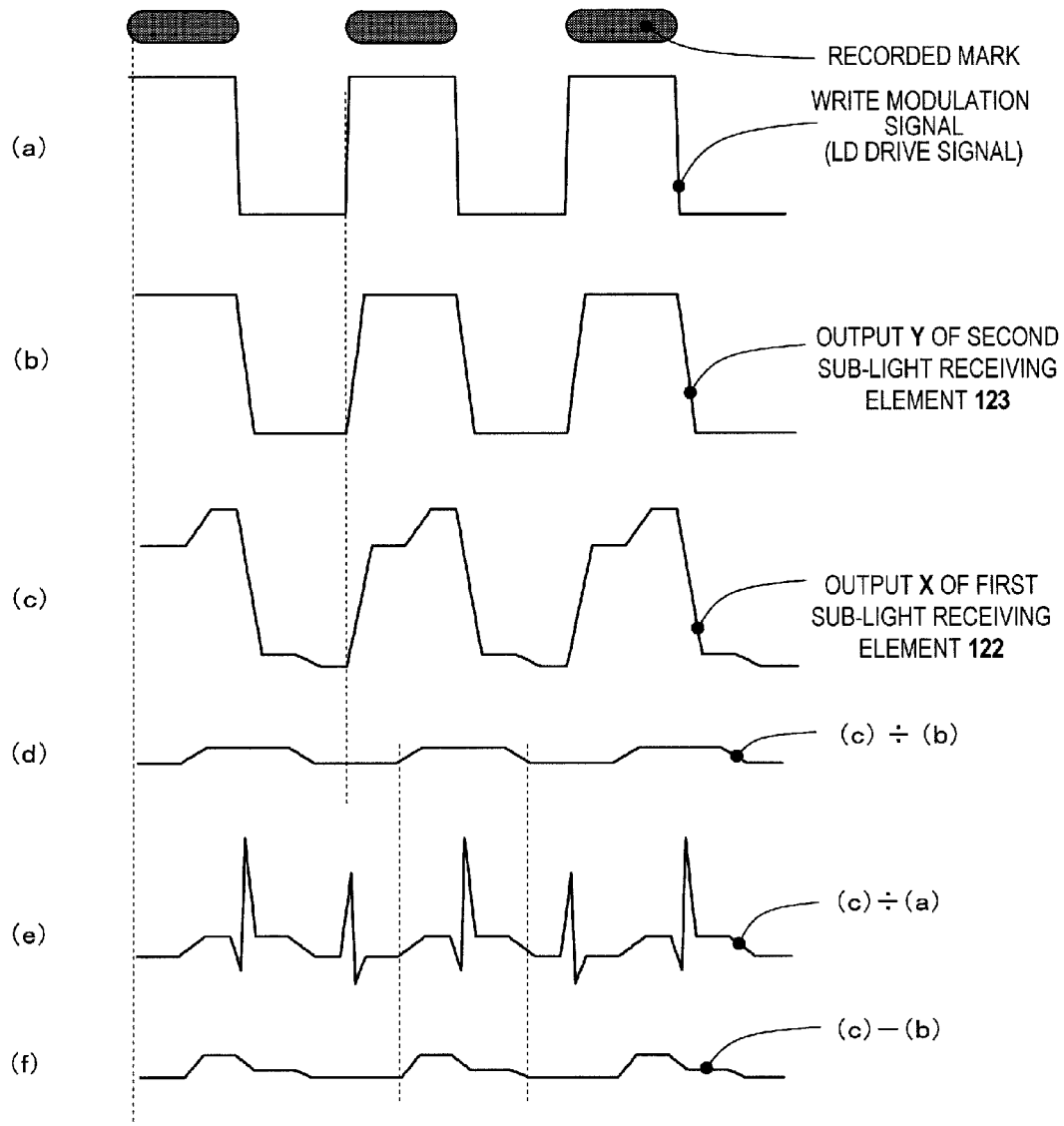
FIG. 5 illustrates exemplary waveforms of various kinds of signals that are generated while a DRAW operation is being performed according to the first embodiment.

FIG. 5 illustrates exemplary waveforms of various kinds of signals that are generated while a verify operation is being performed. Specifically, portion (a) of FIG. 5 shows an exemplary waveform of the write modulation signal supplied from the optical modulator 120 to the light source 110. Portion (b) and (c) of FIG. 5 show exemplary waveforms of the signals Y and X that are output from the second and first sub-light receiving elements 123 and 122 when the emitted light is modulated with the write modulation signal. In FIG. 5, the waveforms of the write modulation signal and the output signals X and Y of the first and second sub-light receiving elements 122 and 123 are illustrated as if they had similar levels in order to compare their waveforms easily. Actually, however, these signals have so different levels that amplification processing is separately carried out to compare them to each other. Portion (d) of FIG. 5 shows the waveform of a signal obtained by dividing the signal X by the signal Y, i.e., the output signal of the divider 124. As comparative examples, the waveform of the read signal generated by the methods of Patent Documents Nos. 3 to 5 is shown in shown in portion (e) of FIG. 5 and that of the read signal generated by the method of Patent Document No. 2 is shown in shown in portion (f) of FIG. 5.

As shown in portion (c) of FIG. 5, the first sub-light receiving element 122 that receives the reflected light that has left the sub-spot 300b of the scanning light beam moving behind the main spot 300a outputs a signal in which a component representing a variation in reflectance caused by the marks that have been newly recorded with the main spot 300a and a component representing a variation in light quantity due to the modulation of the light are superposed one upon the other.

Specifically, in the waveform shown in portion (c) of FIG. 5, a slightly raised portion between a peak and a valley of the write modulated component represents such modulation caused by a recorded mark. On the other hand, since the sub-spot 300c scans an unrecorded portion with no recorded marks ahead of the write spot 300a, the second light receiving element 123 that receives the reflected light that has left the sub-spot 300c outputs a signal that has no components representing the variation in reflectance due to the recorded marks but has only a component representing a variation in light quantity due to the optical modulation of the light source 110 as shown in portion (b) of FIG. 5. As a result, the second sub-light receiving element 123 can be used as a light receiving element that detects the write modulated component.

As shown in portion (b) of FIG. 5, the output Y of the second sub-light receiving element 123 has a similar pulsed waveform to that of the write modulation signal shown in portion (a) of FIG. 5. But the rising and falling edges of the waveform of the output signal Y have some errors. This is probably due to the response characteristics of the light source 110 and the second sub-light receiving element 123 and the delay caused by the signal processing. These errors are also seen in the output X of the first sub-light receiving element 122 shown in portion (c) of FIG. 5. That is why by dividing the output X by the output Y, the influences of their errors can be canceled and a good read signal can be obtained as a result.

The signal shown in portion (e) of FIG. 5 is a signal (c)/(a) that is obtained by dividing the output (c) of the first sub-light receiving element 122 by the write modulation signal (a) and corresponds to the gain controlled read signal of Patent Documents Nos. 3 to 5. This signal has its signal quality affected by errors due to the response characteristics of the light source 110 and the first sub-light receiving element 122.

And the signal shown in portion (f) of FIG. 5 represents the differential output (c)-(d) between the first and second light receiving elements 122 and 123 and corresponds to the read signal of Patent Document No. 2. This signal also has a signal quality problem because the intensity of the light that has been reflected from a recorded mark varies according to the emission power of the light source 110.

Figure 6:
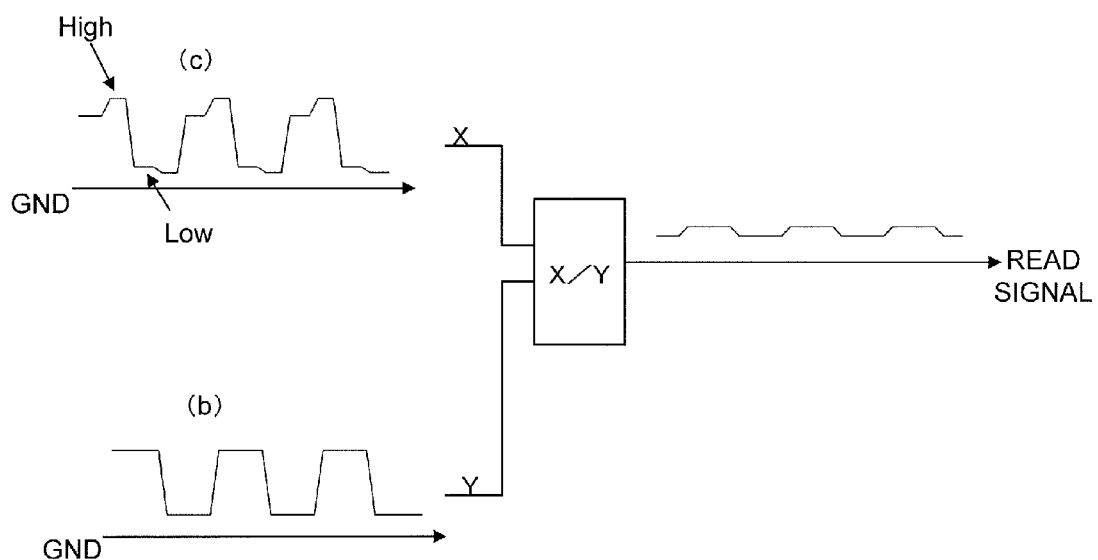
FIG. 6 shows the principle of detecting a read signal according to the first embodiment.

On the other hand, the optical read/write apparatus of this embodiment uses the signal (c)/(b) shown in portion (d) of FIG. 5 as the read signal. FIG. 6 shows how the optical read/write apparatus of this embodiment detects a read signal in principle. As shown in FIG. 6, X/Y is calculated by dividing the output signal X of the first sub-light receiving element 122 in which not only the write modulated components but also the recorded mark modulated components are superposed one upon the other by the output signal Y of the second sub-light receiving element 123 including only the write modulated component, thereby obtaining a read signal X/Y in which the write modulation signal has been subjected to the automatic gain control. In this manner, by dividing those two signals representing the reflected light beams that have left these two sub-spots 300b and 300c by the divider 124, a good read signal can be obtained with the write modulated components removed as shown in portion (d) of FIG. 5 and FIG. 6.

Figure 7:
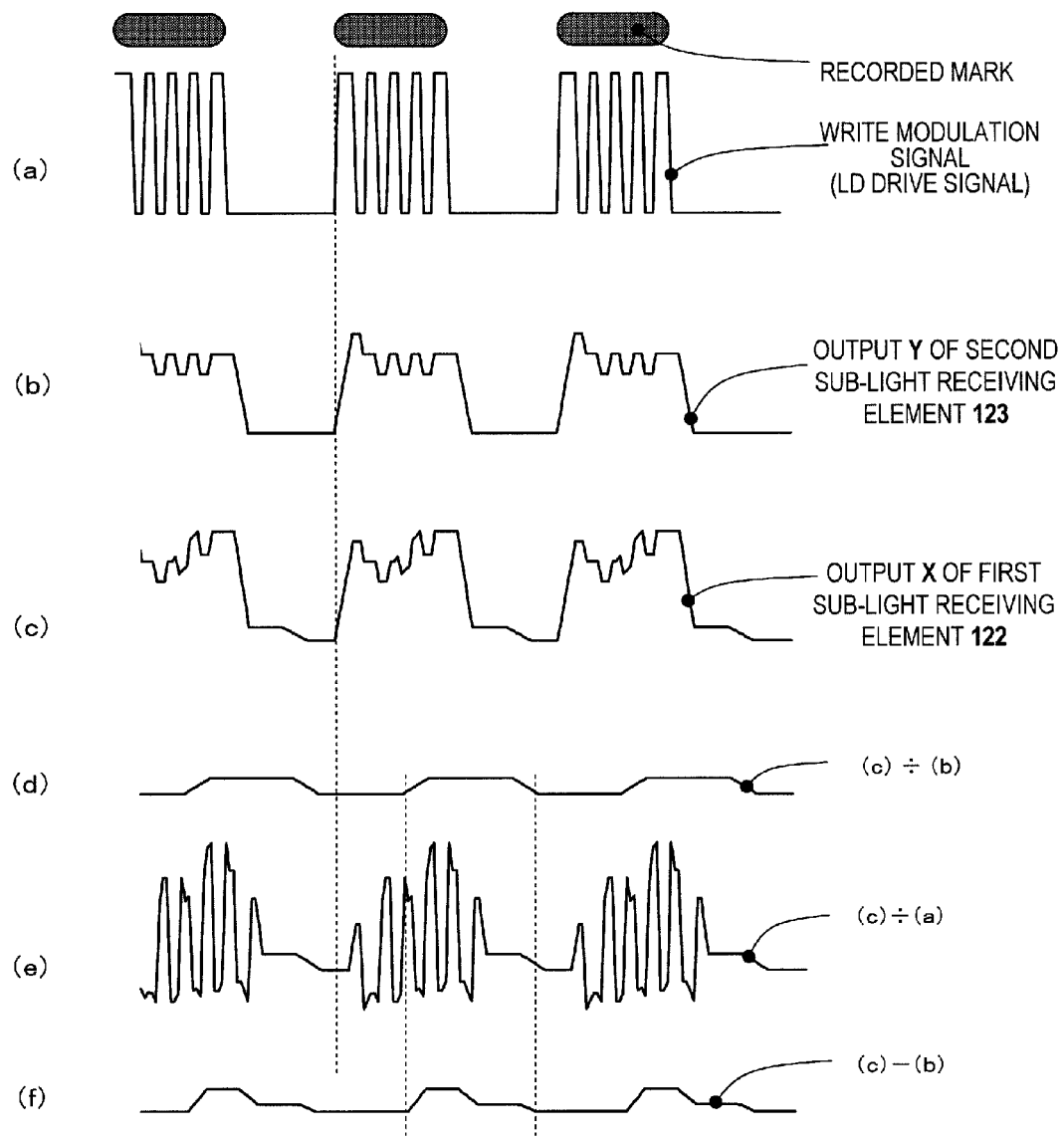
FIG. 7 illustrates other exemplary waveforms of various kinds of signals that are generated while a DRAW operation is being performed according to the first embodiment.

In the example described above, to record a single mark, a single pulse modulated light beam is supposed to be emitted from the light source 110. However, a multi-pulse modulated light beam, which shines ON and OFF a number of times, may be emitted from the light source 110 as well. FIG. 7 illustrates what waveforms may be used in a situation where the multi-pulse modulation is carried out to record each mark while performing the DRAW operation. As in the example illustrated in FIG. 5, the waveform (c)/(d) obtained by dividing the output signal of the first sub-light receiving element 122 by the output signal of the second sub-light receiving element 123 is generated as a read signal as shown in portion (d) of FIG. 7. And the quality of this signal is superior to that of the signal (c)/(a) obtained by dividing the output signal (c) of the first sub-light receiving element 122 by the write modulation signal (a) (of which the waveform is shown in portion (e) of FIG. 7) and that of the signal (c)-(b) obtained by subtracting the output signal (b) of the second sub-light receiving element 123 from the output signal (c) of the first sub-light receiving element 122 (of which the waveform is shown in portion (f) of FIG. 7).

As described above, according to the method of this embodiment, a signal representing a mark that has been recorded on the storage medium 1 is detected by using the signal X/Y that is obtained by dividing the output signal X of the first sub-light receiving element 122 that detects the reflected light that has left the sub-spot 300b by the output signal Y of the second sub-light receiving element 122 that detects the reflected light that has left the sub-spot 300c. As a result, the signal can be detected more accurately than in the related art. The output signal Y can be said to be a write modulation signal, which also reflects the response characteristics of light source 120 and the photodetector 101, unlike the write modulation signal supplied from the optical modulator 120 to the light source 110 (see respective portions (a) of FIGS. 5 and 7). For that reason, the errors at the rising and falling edges of the waveform match perfectly with those of the output signal X. Consequently, if the signal X/Y is used as a read signal, the influence of the errors can be canceled, and therefore, the verify operation can be performed more accurately than in the related art.

Optionally, the write modulated component may be detected by using the output of the front-monitor diode 112 shown in FIG. 2 instead of the output of the second sub-light receiving element 123. The front-monitor diode 112 includes a light receiving element which detects a light beam that has been transmitted through the beam splitter 106 and which outputs an electrical signal representing the quantity of the light received. Just like the output signal of the second sub-light receiving element 123, the output of the front-monitor diode 112 also represents the intensity of the emitted light that has actually been modulated optically with the write modulation signal. That is why if the signal obtained by dividing the output signal of the first sub-light receiving element 122 by the output signal of the front-monitor diode 112 is used as a read signal, the signal can also be detected no less accurately than by the method described above. It should be noted that when this configuration is adopted, two sub-beams do not always have to be converged on the same track on the optical storage medium 1. If the output signal of the second sub-light receiving element 123 is used without using the output signal of the front-monitor diode 112, then the front-monitor diode 112 may be omitted in the first place.

(Embodiment 2)

Hereinafter, a second embodiment of an optical pickup and optical read/write apparatus according to the present invention will be described. The apparatus of this second embodiment has the same basic configuration as the first embodiment described above but uses a different signal processing configuration from that of the first embodiment. Thus, the following description of this second embodiment will be focused on the differences from the first embodiment and their common features will not be described all over again to avoid redundancies.

This embodiment provides an optical read/write apparatus and optical pickup that can perform comparison and correlation operations with good stability even if the time lag to be caused between a point in time when data is written with a write beam and a point in time when that data is read with a read beam has changed due to some variation in operating environment. First of all, the problem to be grappled with by this embodiment will be described.

FIG. 8 shows a relation between a waveform representing the intensity of a write beam (which will be referred to herein as a "write modulated waveform") and a waveform representing the intensity of a reflected light beam that has left a read beam spot after the write beam spot. Specifically, portion (a) of FIG. 8 shows a waveform representing the intensity of a reflected light beam that has left the write beam spot (i.e., a write modulated waveform) and portion (c) of FIG. 8 shows a waveform representing the intensity of a reflected light beam that has left a read beam spot after the write beam spot. Also, portion (b) of FIG. 8 shows a predicted read waveform representing a read signal that should be obtained. And portion (d) of FIG. 8 shows a waveform obtained by removing the write modulated component from the waveform shown in portion (c) of FIG. 8, i.e., an actual read waveform. Even though the signal waveforms shown in portion (b), (c) and (d) of FIG. 8 will actually have various amplitudes and will rise and fall in various manners according to the size of a finite mark that has been recorded on the storage medium 1 due to the spatial MTF (modulation transfer function) thereof, those waveforms are simplified into rectangular waves with constant amplitude and a single frequency to make the principle of this embodiment more easily understandable.

The predicted read waveform shown in portion (b) of FIG. 8 is obtained by adjusting the signal level of the write modulated waveform shown in portion (a) of FIG. 8 and then delaying that adjusted waveform for a predetermined amount of time Ta. This time delay Ta is determined with the lag between a point in time when a mark is recorded with the write beam and a point in time when that recorded mark is scanned with the read beam taken into account. For example, according to the method disclosed in Patent Document No. 5, supposing the interval between the write and read beam spots is d and the relative velocity of each light beam spot with respect to the optical storage medium 1 is v, Ta is set to be d/v. By comparing the predicted read waveform shown in portion (b) of FIG. 8 to the actual read waveform shown in portion (d) of FIG. 8, it can be seen if the mark has been recorded as intended.

However, if the time delay Ta that is set when the predicted read waveform is generated is different from the actual time delay Tb, the verify operation cannot get done as intended. With the known configuration adopted, this problem cannot be overcome and the performance of the verify operation becomes a problem.

FIG. 9 illustrates an exemplary configuration for performing the verify operation using the respective waveforms shown in FIG. 8. This exemplary configuration includes a waveform predicting section 910 that generates the predicted read signal (b), a write modulation removing section 920 that generates a signal (d) by removing the write modulated component from the signal (c) representing the reflected light that has left the read beam spot, and a comparing section 930 that compares the signal (b) to the signal (d). The write modulated component is removed by the write modulation removing section 920 from the signal (c) representing the reflected light that has left the read beam spot, and the signal (d) is output. Meanwhile, the signal (a) representing the write modulated component gets passed through an equalizer 912 and a delay circuit 914 included in the waveform predicting section 910 to turn into the predicted read waveform (b). These signals (b) and (d) are compared to each other by the comparing section 930, thereby seeing if the write operation has been done as intended.

However, the light emitted from a semiconductor laser diode, which is a typical example of the light source 110, will cause a variation in its wavelength when its output power or environmental temperature changes. Due to that wavelength variation, the angle of diffraction produced by the diffraction grating 111 changes, so does the interval between the main spot 300a and the sub-spots 300b, 300c. When that interval changes, the actual time delay Tb changes, thus making a difference between the predicted read signal (b) and the actual read signal (d) from which the write modulated component has been removed. As a result, it becomes difficult for the comparing section 930 to obtain an appropriate result of comparison and correlation.

The interval between the main spot 300a and the sub-spot 300b that have been separated by the diffraction grating 111 changes substantially proportionally to the wavelength variation. Supposing that the light source 110 emits a blue laser beam with a wavelength of 405 nm under some environmental condition and that its wavelength has changed into 410 nm due to a variation in the environmental condition, the interval between the spots increases by approximately 1%. Specifically, if the interval between the main spot 300a and the sub-spot 300b is 100 μm, the interval between the spots changes by approximately 1 μm. If data is written on the optical storage medium 1 at as high a density as on a Blu-ray Disc, one clock pulse width corresponds to a distance of 0.074 μm. That is why a change of 1 μm corresponds to the sum of the widths of fourteen clock pulses, and therefore, is non-negligible.

In this manner, an error could occur in the time delay between the actual read waveform (d), which is obtained by removing the influence of write modulation from the waveform (c) of the signal representing the reflected light that has left the sub-spot 300b, and the predicted read waveform (b) to be detected by the first sub-light receiving element 122. That is why in some cases, the comparing section 930 shown in FIG. 9 cannot make appropriate comparison and correlation.

Thus, according to this embodiment, such a problem is overcome by improving the waveform comparing configuration. Hereinafter, the configuration and operation of this embodiment will be described.

Figure 10:
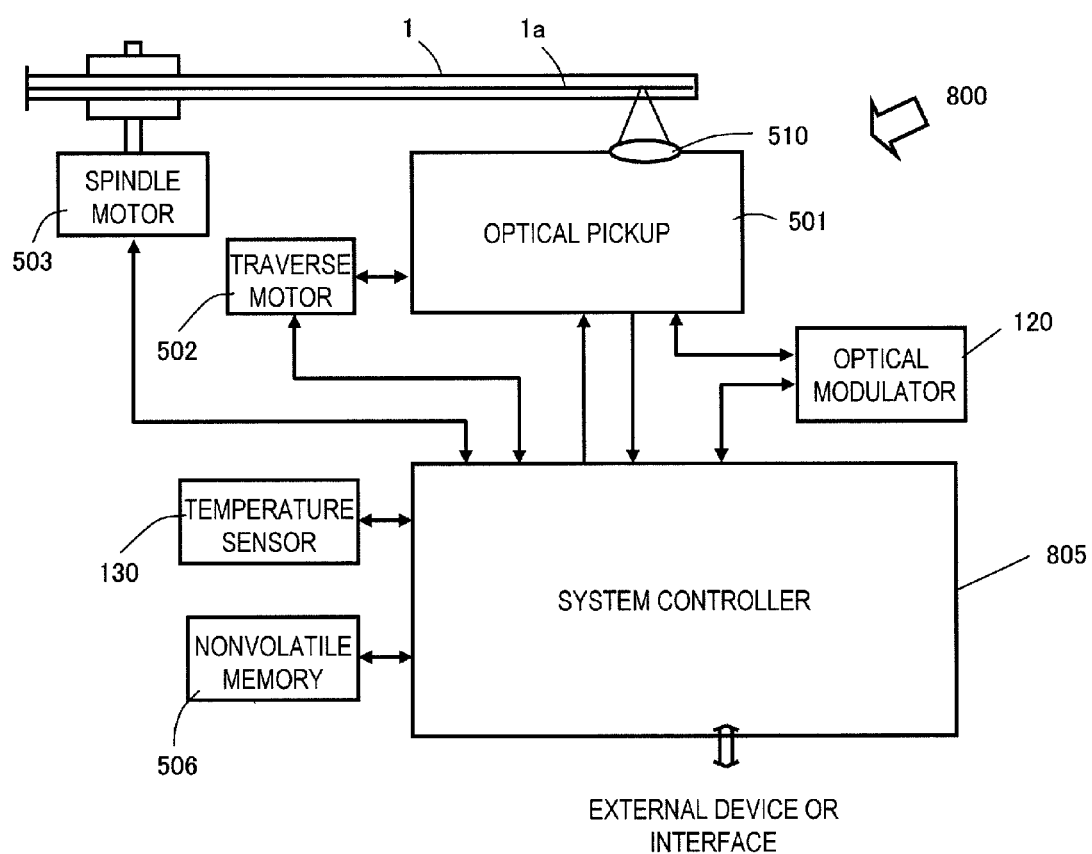
FIG. 10 is a block diagram illustrating an exemplary configuration for an optical read/write apparatus 800 as a second embodiment of the present invention.

FIG. 10 is a block diagram illustrating an exemplary overall configuration for an optical read/write apparatus 800 according to this embodiment. In this example, the apparatus 800 includes not only every component shown in FIG. 1 but also a temperature sensor 130 that measures the environmental temperature as well.

Figure 11:
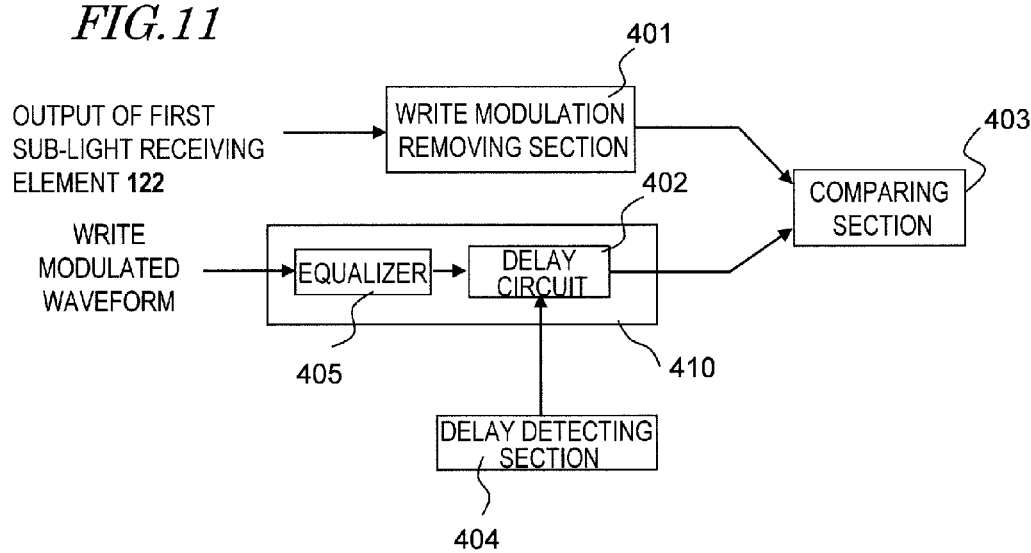
FIG. 11 is a block diagram illustrating an exemplary configuration for predicting and comparing a waveform according to the second embodiment.

FIG. 11 illustrates functional blocks for making waveform prediction and comparison in the system controller 805 of the optical read/write apparatus 800. The system controller 805 includes a waveform predicting section 410 that produces a predicted read waveform based on the write modulated waveform using an equalizer 405 and a delay circuit 402, a write modulation removing section 401 that generates an actual read waveform by removing the write modulated component from the output of the first sub-light receiving element 122, a comparing section 403 that compares the actual read waveform to the predicted read waveform, and a delay detecting section 404 that detects a time delay and adjusts the amount of delay caused by a delay circuit 402. The configuration shown in FIG. 11 further includes the delay detecting section 404, which is a difference from the configuration shown in FIG. 9.

In this case, the write modulated waveform is a waveform representing the write modulated component included in the light beam that has been emitted from the light source 110, and may be obtained based on the output of the main light receiving element 121, for example. Alternatively, the write modulated waveform may also be obtained based on the output of the second sub-light receiving element 123 or that of the front-monitor diode 112. Still alternatively, the write modulated waveform may also be generated based on the write modulation signal supplied from the optical modulator 120 to the light source 110. If the write modulated waveform is generated based on the write modulation signal, however, the influence of an error in waveform could be significant as already described for the first embodiment.

In this embodiment, the write modulation removing section 401 includes the divider 124 shown in FIG. 4 and removes the write modulated component by the method that has already been described with reference to FIG. 4. However, that method is not necessarily adopted in this embodiment. For example, as disclosed in Patent Document No. 2, the output of the second sub-light receiving element 123 may be subtracted from that of the first sub-light receiving element 122. Alternatively, as disclosed in Patent Documents Nos. 3 to 5, the output of the first sub-light receiving element 122 may be divided by the write modulation signal. If any of these methods disclosed in Patent Document Nos. 2 to 5 is adopted, the signal quality could be debased but the time delay can still be optimized as in this embodiment.

By appropriately changing the amount of time delay caused by the delay circuit 402 using the delay detecting section 404 as shown in FIG. 11, the comparison and correlation (or verify) operation can get done properly.

Figure 12:
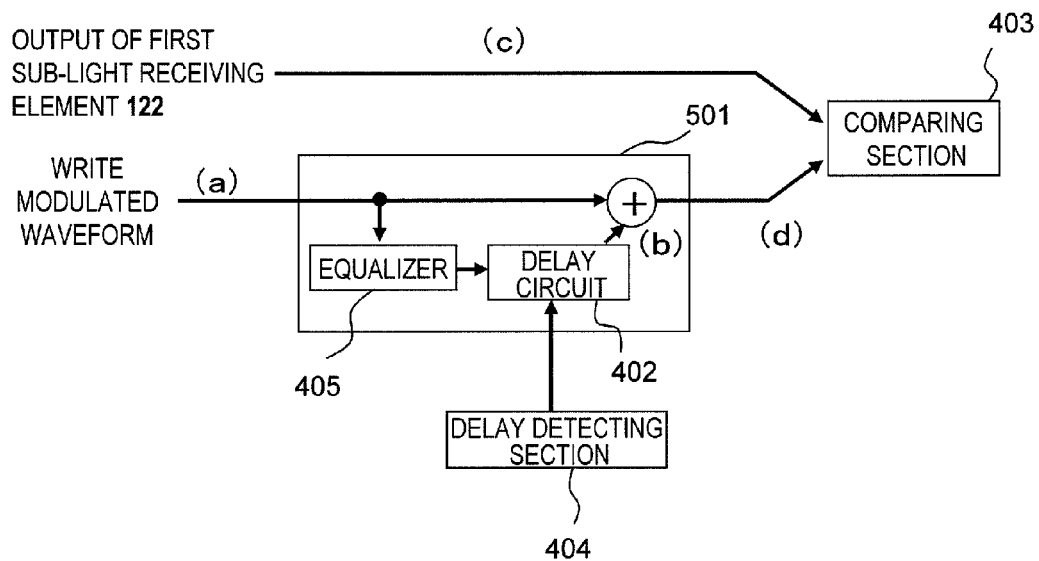
FIG. 12 is a block diagram illustrating another exemplary configuration for predicting and comparing a waveform according to the second embodiment.

Optionally, to get that pre-processing for comparison and correlation done, the configuration shown in FIG. 12 may also be adopted instead of the one shown in FIG. 11. In the exemplary configuration shown in FIG. 12, a waveform predicting section 501 adds together the write modulated waveform (a) and a waveform (b), which is obtained by passing the write modulated waveform through at least an equalizer 405 and a delay circuit 402, thereby generating a waveform (d). And the verify operation can also get done by comparing this waveform (d) to the output waveform (c) of the first sub-light receiving element 122.

The delay detecting section 404 shown in FIGS. 11 and 12 changes the amount of delay by reference to information about a variation in the temperature of the environment surrounding the optical pickup 501. Such an environmental temperature variation is measured by the temperature sensor 130 shown in FIG. 10.

Figures 13, 14:
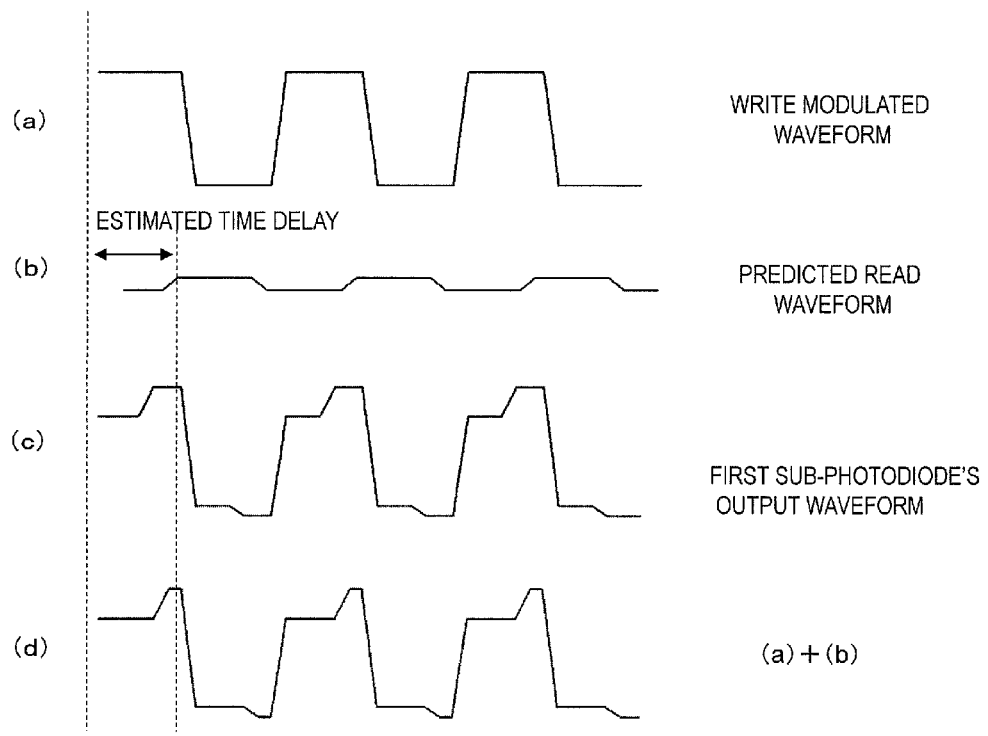
FIG. 13 illustrates exemplary waveforms of various kinds of signals to be generated when the exemplary configuration shown in FIG. 12 is adopted.
FIG. 14 shows how the time delay may change as the temperature varies according to the second embodiment.

FIG. 13 shows exemplary waveforms at the respective sections shown in FIG. 12. Specifically, portion (a) of FIG. 13 shows the write modulated waveform of the write beam spot, portion (b) shows the (predicted) read waveform of a write signal (or written signal) to be read at the read beam spot, portion (c) of FIG. 13 shows the waveform of an actual signal representing the reflected light that has left the sub-spot 300b (i.e., the output signal of the first sub-light receiving element 122), and portion (d) of FIG. 13 shows a synthetic waveform of the write modulated waveform and the predicted read waveform (i.e., the waveform that has passed through the waveform predicting section 501).

FIG. 14 shows how the spot interval and the time delay change in a situation where the light source 110 is a blue-ray-emitting laser diode, the interval between the write and read beam spots is 100 μm, and the data storage density is as high as on a Blu-ray Disc. Specifically, the columns of this table indicate, from the left to the right, the environmental temperature (° C.) of the blue-ray-emitting laser diode, the wavelength (nm) of the blue laser beam at that temperature, the interval (μm) between the write and read beam spots at that wavelength, the time delay (μs) and the time delay (clock pulses), respectively. A table such as the one shown in FIG. 14 is stored in the nonvolatile memory 506 shown in FIG. 10.

As shown in FIG. 10, the optical read/write apparatus 800 of this embodiment further includes a temperature sensor 130 that senses a variation in environmental temperature. The temperature information gotten by the temperature sensor 130 is provided for the delay detecting section 404 in the system controller 805. In response, the delay detecting section 404 adjusts the amount of delay caused by the delay circuit 402 according to the temperature variation sensed. The amount of delay to be changed according to the temperature variation is determined by the table that is stored in the nonvolatile memory 506. When the temperature sensor 130 senses the temperature variation, the delay detecting section 404 operates so as to adjust the amount of delay as needed by reference to that table.

By adopting such a configuration, according to this embodiment, even if the amount of delay changes as the temperature varies, the delay detecting section 404 can set an appropriate amount of delay with respect to the delay circuit 402. As a result, the read signal can be detected more accurately than when the configuration shown in FIG. 9 is adopted. The table stored in the nonvolatile memory 506 does not have to be made up of all of the items shown in FIG. 14 but may consist of only the temperature and the time delay. The table stored in the nonvolatile memory 506 had better be used easily in an actual control step. For example, if the delay detecting section 404 is configured to change the time delay every time the temperature varies by 5° C., then time delay information is suitably defined on a 5° C. basis on the table. Optionally, the nonvolatile memory 506 may also retain information representing a function that defines the relation between the temperature and the time delay instead of the table. Also, it is recommended that the best initial value be set for the time delay on an optical pickup device basis.

By adopting such a scheme, even if the distance between the write and read beam spots changes as the temperature varies, the delay detecting section 404 can set an appropriate amount of delay with respect to the delay circuit 402. As a result, the read signal can be detected more accurately.

In the example described above, any variation in environmental temperature is sensed using the temperature sensor 130. However, the temperature sensor 130 does not always have to be used. For example, as will be described below, a variation in time delay may be sensed directly through signal processing and the time delay may be controlled so as to cancel its variation. Hereinafter, some exemplary configurations for the photodetector 101 that detects a change of the time delay will be described.

FIG. 15 illustrates a first exemplary configuration for the photodetector 101 that generates a delay detection signal without using any temperature sensor 130. In this exemplary configuration, the photodetector 101 includes a main light receiving element 131 that receives a main beam 400a, a sub-light receiving element 132 that receives a sub-beam 400b for reading, a differential amplifier 135 connected to the sub-light receiving element 132, and an adder 134. In this example, provided is no light receiving element corresponding to the second sub-light receiving element 123 shown in FIG. 4.

As shown in FIG. 15, the sub-light receiving element 132 that receives the reflected light 400b that has left the sub-spot 300b is divided into two photosensitive areas, which are arranged side by side in a direction corresponding to the track direction on the optical storage medium 1 (i.e., vertically on the paper on which FIG. 15 is drawn). The amount of delay can be detected by getting the differential output (i.e., a delay detection signal) between those two photosensitive areas detected by a differential amplifier 135. If the sub-spot 300b moves toward, or away from, the main spot 300a (i.e., vertically on the paper on which FIG. 15 is drawn), the DC voltage of the differential output of the sub-light receiving element 132 varies. By monitoring this voltage variation, the change in the amount of delay can be directly detected more accurately than in a situation where a variation in temperature is monitored.

If either a conversion table to determine the amount of delay based on the delay detection signal output or information indicating a function that defines the relation between the delay detection signal and the amount of delay is stored in the nonvolatile memory 506, an appropriate amount of delay can be set.

FIG. 16 illustrates a second exemplary configuration for the photodetector 101 that generates a delay detection signal. As shown in FIG. 16, the amount of delay may be detected based on the differential output of a light receiving element 143 that receives the reflected light 400c that has left the second sub-spot 300c. As in the light receiving element 132 shown in FIG. 15, the light receiving element 143 is also divided into two photosensitive areas, which are arranged side by side in a direction corresponding to the track direction on the optical storage medium 1 (i.e., vertically on the paper on which FIG. 16 is drawn). The delay detection signal can be obtained by getting the differential output between those two photosensitive areas detected by a differential amplifier 145. Since the light receiving element 143 dedicated to detecting the amount of delay is not affected by recorded mark modulated components, it is beneficial to use the configuration shown in FIG. 16 to detect the magnitude of the variation.

Figure 17:
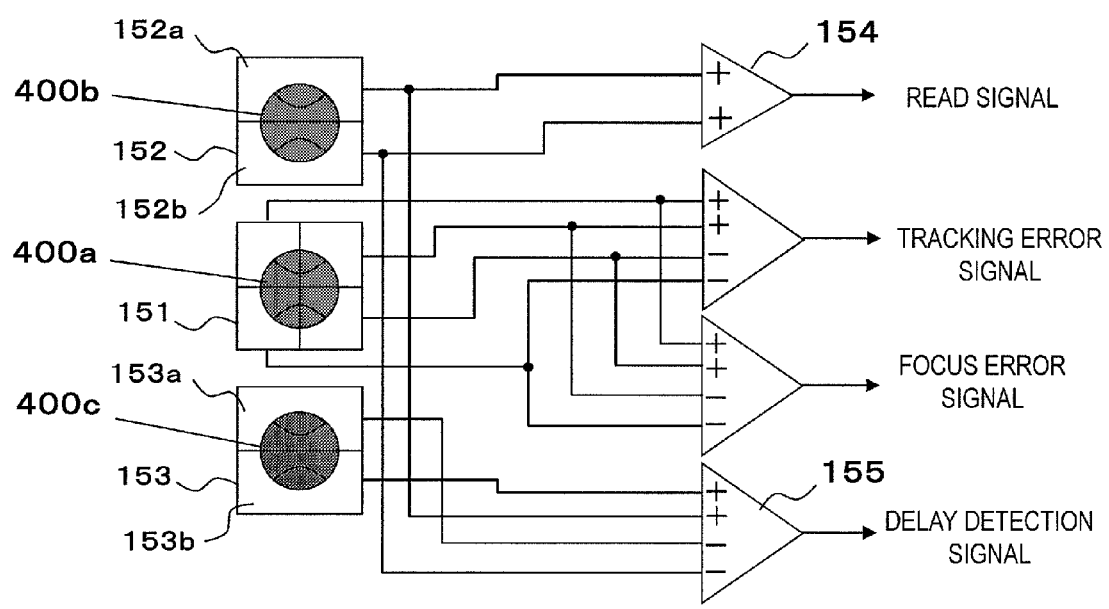
FIG. 17 illustrates a third exemplary configuration for a photodetector that generates a delay detection signal according to the second embodiment.

FIG. 17 illustrates a third exemplary configuration for the photodetector 101 that generates a delay detection signal. As shown in FIG. 17, the delay detection signal may also be generated by combining the outputs of sub-light receiving elements 152 and 153 that receive the reflected light beams 400b and 400c that have left the two sub-spots 300b and 300c, respectively.

In this example, the first sub-light receiving element 152 is divided into two photosensitive areas 152a and 152b, which are arranged side by side in a direction corresponding to the track direction (i.e., vertically on the paper on which FIG. 17 is drawn) and the second sub-light receiving element 153 is divided into two photosensitive areas 153a and 153b, which are also arranged side by side in the direction corresponding to the track direction. And the photosensitive areas 152a and 152b of the first sub-light receiving element 152, the main light receiving element 151, and the photosensitive areas 153a and 153b of the second sub-light receiving element 153 are arranged in this order in the direction corresponding to the track direction. A differential amplifier 155 makes a differential arithmetic operation (152a+153b−152b−153a) between one combination of photosensitive areas 152a and 153b that are more distant from the main light receiving element 151 and the other combination of photosensitive areas 152b and 153a that are closer to the main light receiving element 151. By performing that arithmetic operation, a delay detection signal can be obtained with the influence of other DC variations that occur in a signal representing the reflected light that has left the sub-spot 300b for reading (e.g., a DC variation caused by the move of the objective lens 510 following the eccentricity of the optical storage medium 1) reduced. By adopting this exemplary configuration, the variation in the distance between the main and sub-spots can be detected with good stability.

Although each of the light receiving elements to be subjected to the differential arithmetic operation is supposed to be split into two photosensitive areas in the examples illustrated in FIGS. 15 through 17, the light receiving element may also be divided into three or more photosensitive areas. In that case, the photodetector 101 may be configured so that at least two photosensitive areas thereof satisfy any of the positional relations shown in FIGS. 15 through 17.

Hereinafter, it will be described in what procedure the processing of measuring the amount of delay in the examples illustrated in FIGS. 15 to 17 is carried out.

Figure 18:
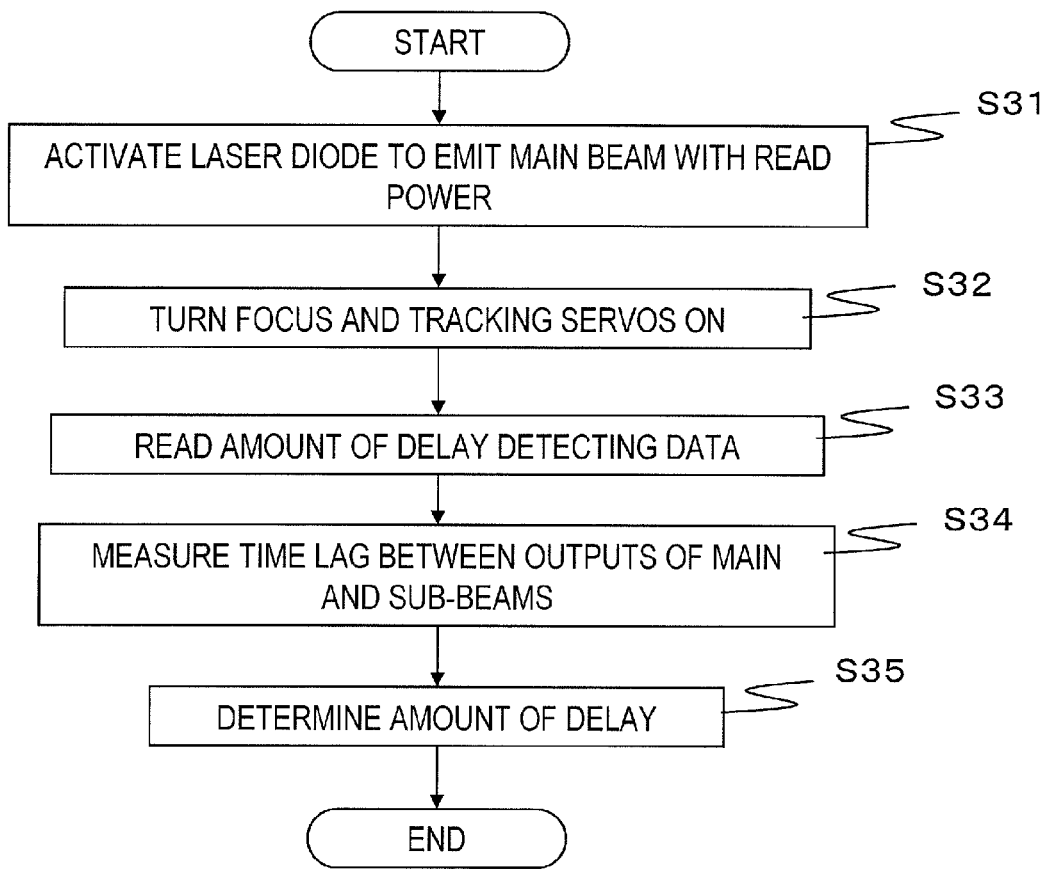
FIG. 18 is a flowchart showing an exemplary procedure of the operation of measuring a time lag between a main beam signal and a sub-beam signal according to the second embodiment.

FIG. 18 is a flowchart showing the procedure of the amount of delay measuring processing. On the optical storage medium 1, amount of delay detecting data (test data) is written in advance. In this case, the data to be written may be either the data to be generated when the optical storage medium 1 is made (e.g., address information) or the data that has been written in advance by the optical read/write apparatus 800 of this embodiment. First of all, the light source (i.e., a laser diode) 110 is activated so as to emit a main beam with read power (in Step S31). Next, the focus and tracking servos are turned ON to scan the optical storage medium 1 with a light beam spot (in Step S32). Subsequently, the area where the amount of delay detecting data is stored is scanned with a main beam and a sub-beam, thereby reading the amount of delay detecting data (in Step S33). Thereafter, the amount of delay between the respective outputs of the main and sub-light receiving elements is detected and measured by the delay detecting section 404 of the system controller 805 (in Step S34). Thereafter, by reference to the table or function that is stored in advance in the nonvolatile memory 506, the delay detecting section 404 determines the amount of delay to be caused by the delay circuit 402 (in Step S35). By using this amount of delay when performing the DRAW operation, the system controller 805 can detect a read signal of quality.

The amount of delay detecting data may be set in an area to be read from, or written to, earlier than anywhere else on the optical storage medium 1 (such as a lead-in area on an optical disc). Alternatively, multiple sets of amount of delay detecting data may be set in a read/write area on the optical storage medium 1 so that the amount of delay can be detected regularly. Still alternatively, the amount of delay detecting data may be written in advance using the optical pickup of this embodiment itself and then the amount of delay may be detected between the main and sub-spots.

Figure 19:
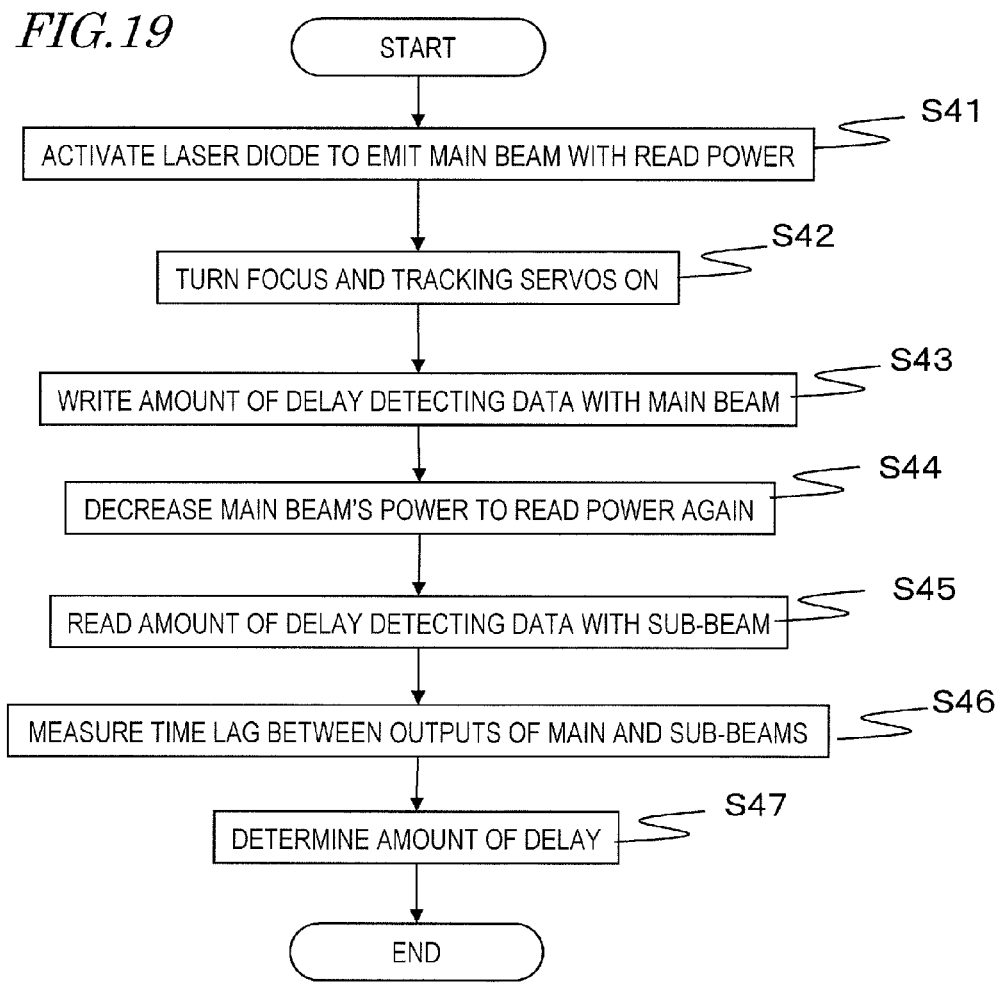
FIG. 19 is a flowchart showing another exemplary procedure of the operation of measuring a time lag between a main beam signal and a sub-beam signal according to the second embodiment.

FIG. 19 is a flowchart showing another exemplary procedure of the amount of delay measuring processing. In this example, first of all, the light source 110 is activated so as to emit a main beam with read power (in Step S41). Next, the focus and tracking servos are turned ON to scan the optical storage medium 1 with a light beam spot (in Step S42). Subsequently, the output power of the light source 110 is increased to emit a main beam with write power and the amount of delay detecting data is written with a main spot (in Step S43). After that, the optical power of the main beam is decreased to the read power again (in Step S44). In this process step, the quantity of the data to be written is set so that the write operation can be finished in a much shorter time than the amount of delay between the main and sub-spots. Subsequently, the amount of delay detecting data is read with a sub-beam (in Step S45). Thereafter, the amount of delay between the respective outputs of the main and sub-light receiving elements is detected and measured by the delay detecting section 404 of the system controller 805 (in Step S46). Thereafter, by reference to the table or function that is stored in advance in the nonvolatile memory 506, the delay detecting section 404 determines the amount of delay to be caused by the delay circuit 402 (in Step S47). To measure the amount of delay more accurately, this measuring process may be carried out a number of times. By carrying out this flow, the amount of delay can be measured while data is being written, and when the data that has been written is read, the write operation can be stopped to avoid affecting the read signal. That is why the amount of delay measured can be kept accurate enough. In this example, in accordance with the data saved in advance in the nonvolatile memory 506 to specify how many times the delay needs to be measured, the system controller 805 may be configured to measure the amount of delay that specified number of times. By using the amount of delay measured to perform the DRAW operation, a read signal of good quality can be detected.

(Embodiment 3)

Hereinafter, an optical pickup and optical read/write apparatus as a third embodiment of the present invention will be described. The optical pickup and optical read/write apparatus of this embodiment can overcome the problem that arises when a DRAW operation is performed on an optical storage medium with multiple storage layers. The optical read/write apparatus of this embodiment has basically the same overall configuration as what is shown in FIG. 1 but includes an optical pickup with a different arrangement and a system controller that performs different processing from their counterparts of the first embodiment described above. Thus, the following description of this third embodiment will be focused on those differences from the first embodiment and their common features will not be described all over again to avoid redundancies.

Figure 20:
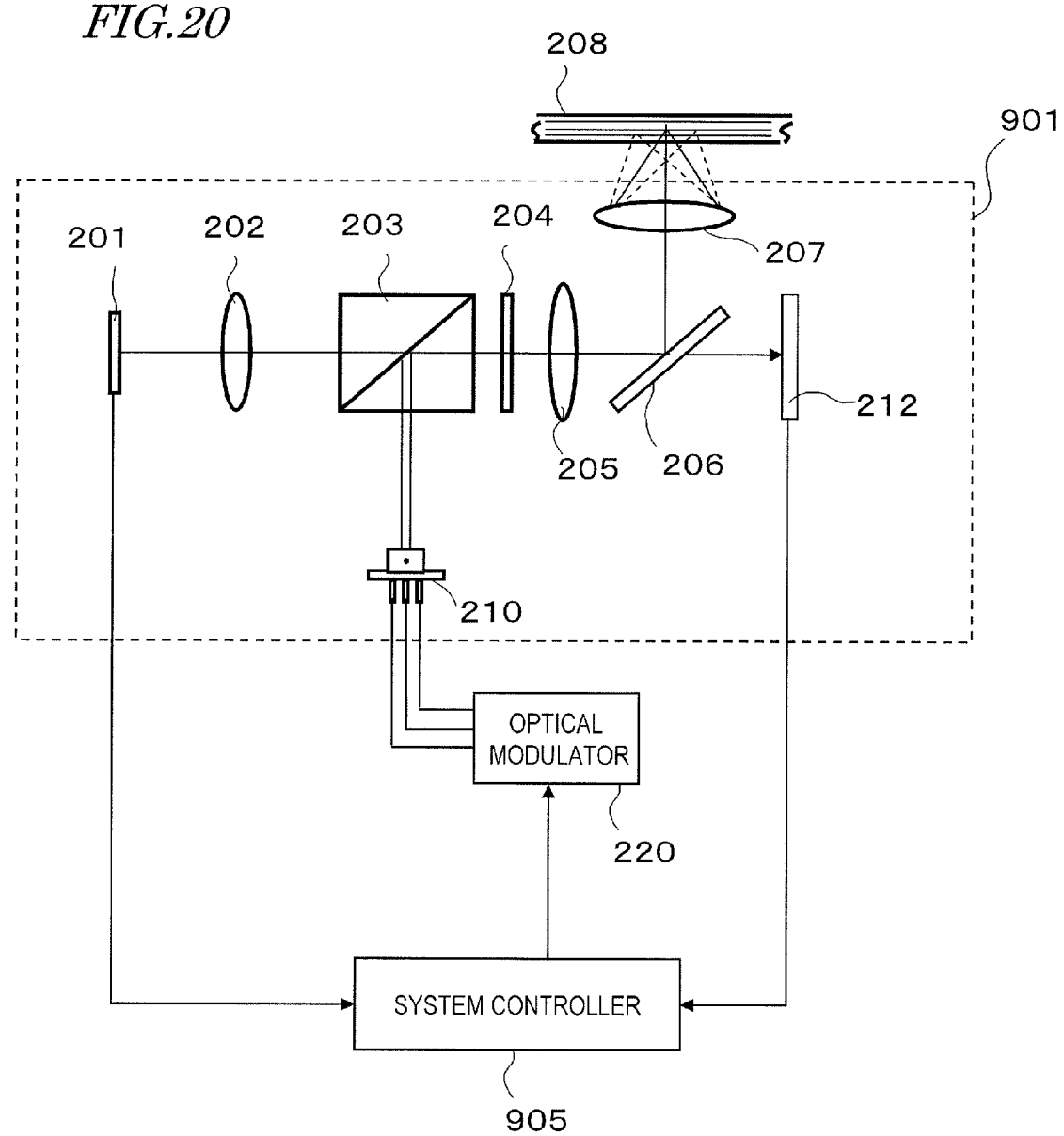
FIG. 20 illustrates a configuration for an optical pickup 901 according to a third embodiment of the present invention.

FIG. 20 illustrates the optical configuration of an optical pickup 901 for the optical read/write apparatus of this embodiment. As shown in FIG. 20, the optical system of this optical pickup 901 includes a 2LD light source 210 with two laser diodes that each emit a laser beam of the same wavelength, a beam splitter 203, a wave plate 204, a condenser lens 205, another beam splitter 206, an objective lens 207, a detector lens 202 and a photodetector 201.

Figure 21:
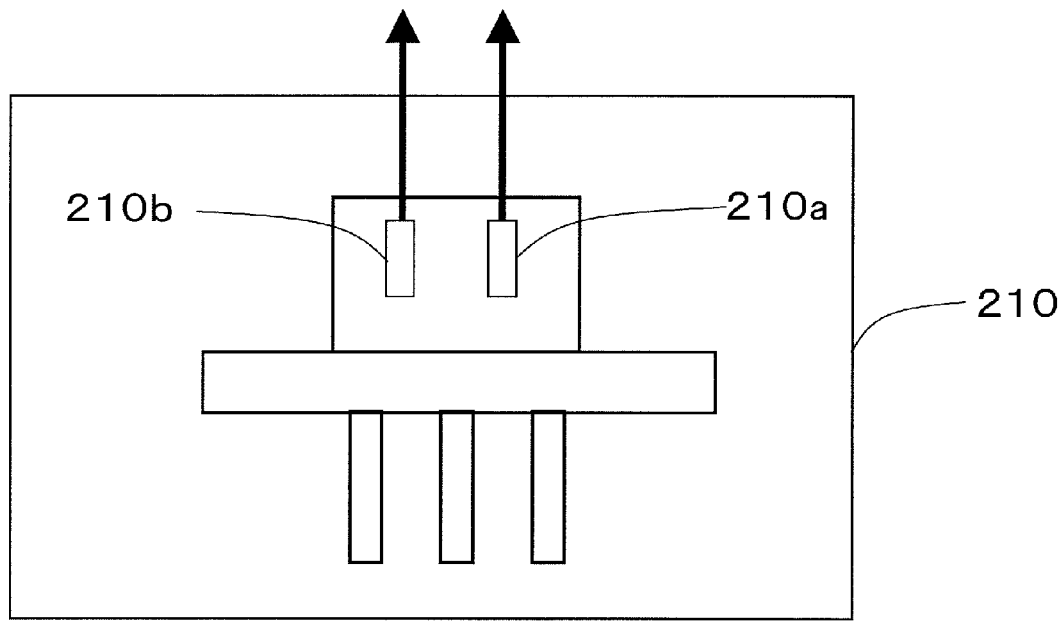
FIG. 21 illustrates an internal configuration for a light source 210 according to the third embodiment.

FIG. 21 schematically illustrates the configuration of the 2LD light source 210 of this embodiment. As shown in FIG. 21, the 2LD light source 210 includes a main laser diode 210a that emits a main beam for writing and a sub-laser diode 210b that emits a sub-beam for reading. These two laser diodes 210a and 210b are arranged so as to shift from each other perpendicularly to the light-emitting direction (i.e., the vertical direction on the paper on which FIG. 21 is drawn). That is to say, these two laser diodes 210a and 210b are shifted from each other horizontally on the paper. The light beams that have been emitted from these laser diodes are condensed by the objective lens 207 onto the same track of one of the multiple storage layers of the optical storage medium 208, thereby forming at least two condensed beam spots (i.e., a main spot and sub-spot) there.

Figure 22:
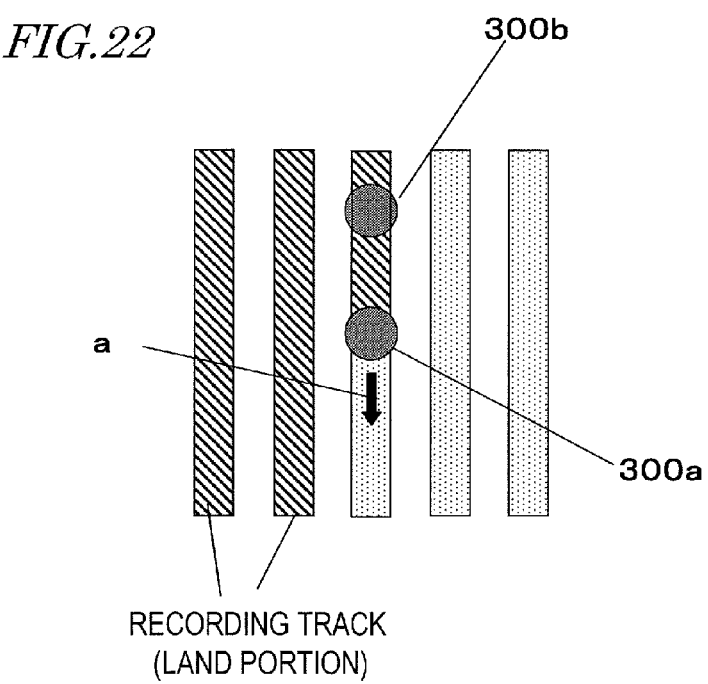
FIG. 22 illustrates examples of a main spot 300a and a sub-spot 300b on an optical storage medium according to the third embodiment.

FIG. 22 illustrates an arrangement of light beam spots that have been condensed on the same storage layer of the optical storage medium 208. The optical system of the optical pickup 901 is adjusted so that the main spot 300a and the sub-spots 300b are arranged on the same track. And during a read or write operation, the optical storage medium 208 is scanned with these light beam spots that move in the direction indicated by the arrow a. Each of those light beams that have been emitted from the light source 210 is reflected from the optical storage medium 208, transmitted through the optical system and then incident on the photodetector 201, where the light beam has its quantity of light detected.

In FIG. 22, the main spot 300a is a write beam spot and used to write data on a track on the storage medium 208. On the other hand, the sub-spot 300b is a read beam spot that has a much lower light intensity than the write beam spot and that is used to read data that has been written on the track.

FIG. 23 shows exemplary waveforms of the laser beams emitted from the two laser diodes that are mounted on the 2LD light source 210. Portion (a) of FIG. 23 shows the emission waveform of the main beam, while portion (b) of FIG. 23 shows the emission waveform of the sub-beam. With this configuration, the main beam for writing and the sub-beam for reading can be emitted separately from each other. That is why even while a write operation is being performed using the main beam (i.e., while light is being emitted with the write modulated waveform), the sub-beam can also be emitted with constant read power. Thus, according to this embodiment, the optical modulator 220 can drive the main laser diode 210a and the sub-laser diode 210b independently of each other.

FIG. 24 illustrates the arrangement of light receiving elements in the photodetector 201. As shown in FIG. 24, the light receiving element 213 with four divided photosensitive areas is arranged to receive the reflected light that has left the main spot 300a on the storage layer of the optical storage medium 208. The magnitude of astigmatism produced by the detector lens 202 shown in FIG. 20 changes with the degree of defocusing, thereby detecting a focus error signal. The light receiving element 213 also detects a tracking error signal by the push-pull method. On the other hand, the light receiving element 214 is arranged to receive the reflected light that has left the sub-spot 300b on the storage layer of the optical storage medium 208.

As described above, the optical storage medium 208 of this embodiment has multiple storage layers. That is why the light receiving elements 213 and 214 receive not only the light that has been reflected from a target storage layer of the read/write operation but also the light that has been reflected from another storage layer (which will be referred to herein as "another layer's stray light") as well. Specifically, on the light receiving element 214 that receives the reflected light that has left the sub-spot 300b, incident are not only the sub-beam that has been reflected from the target storage layer on which the read/write operation is performed but also the sub-beam that has been reflected from another layer (which will be referred to herein as "sub-another layer's stray light") and the main beam that has been reflected from another layer (which will be referred to herein as "main another layer's stray light") as well. While a write operation is being performed, the optical power of the main beam emitted may be ten times as high as that of the read beam emitted, for example. That is why the influence of the main beam that has been reflected as stray light from another layer on the sub-beam that has been reflected from the target layer of the write operation is relatively significant and non-negligible. On the other hand, the influence of the sub-beam that has been reflected as stray light from another layer is much less significant and is negligible.

Thus, according to this embodiment, another light receiving element 215 is provided to receive only that main beam that has been reflected as stray light from another layer. By subtracting the output of the light receiving element 215 from that of the light receiving element 214, the component of the main beam that has been reflected as stray light from another layer can be removed from the output of the light receiving element 214. For that reason, it is recommended that the light receiving element 215 be arranged symmetrically to the light receiving element 214 with respect to the light receiving element 213 that detects the reflected light that has left the main spot.

Figure 25:
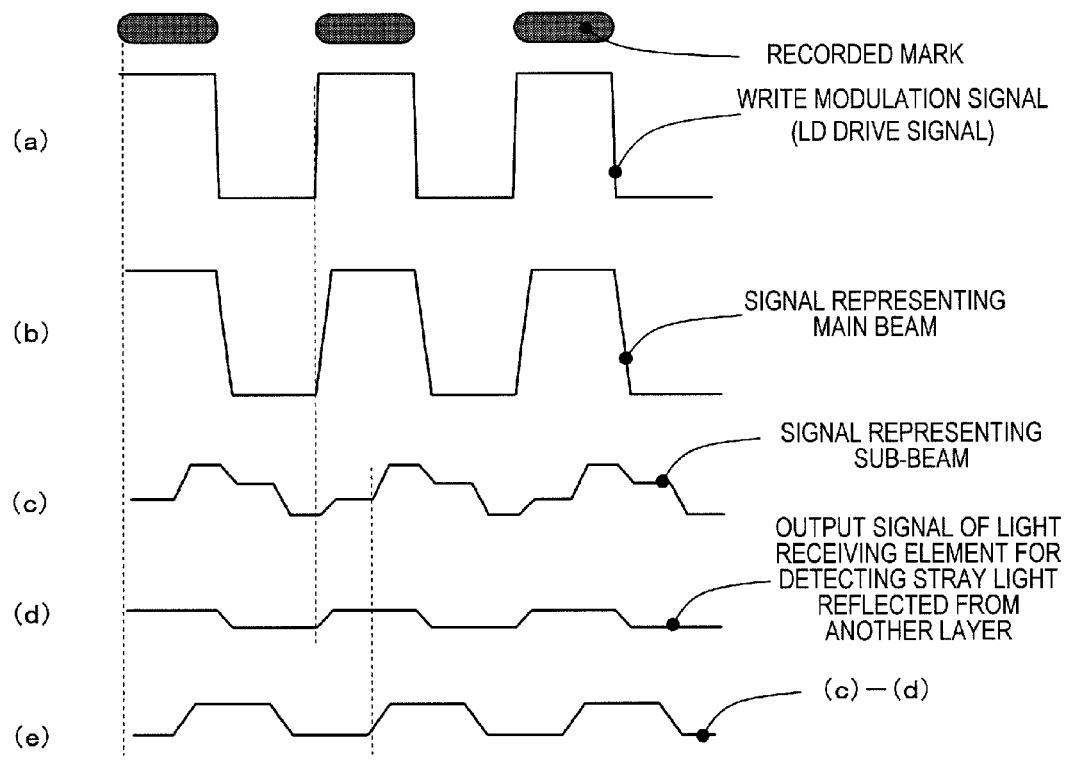
FIG. 25 illustrates exemplary waveforms of various kinds of signals that are generated while a DRAW operation is being performed according to the third embodiment.

FIG. 25 illustrates the waveforms of respective kinds of signals while a DRAW operation is being performed on the optical storage medium 208 with multiple storage layers. Specifically, portion (a) of FIG. 25 shows the waveform of a write modulation signal (LD drive signal) supplied to the light source 210. Portion (b) of FIG. 25 shows the waveform of a signal representing the intensity of the reflected light that has left the main spot 300*a* (i.e., the output of the light receiving element 213). Portion (c) of FIG. 25 shows the waveform of a signal representing the intensity of the reflected light that has left the sub-spot 300*b* (i.e., the output of the light receiving element 214). Portion (d) of FIG. 25 shows the waveform of a signal representing the intensity of the sub-beam that has been reflected as stray light from another layer (i.e., the output of the light receiving element 215). As described above, the light receiving element 214 receives not only the sub-beam that has been reflected from the target storage layer being scanned but also the main beam that has been reflected as stray light from another layer as well. Meanwhile, the light receiving element 215 receives only that main beam that has been reflected as stray light from another layer and the quantity of that light is approximately equal to that of the main beam that has been received by the light receiving element 214 as stray light from another layer. Consequently, as shown in portion (e) of FIG. 25, by subtracting the output signal (d) of the light receiving element 215 that detects the light that has been reflected as stray light from another layer from the sub-beam read signal (c) supplied from the light receiving element 214, a read signal of quality can be detected.

Figure 26:
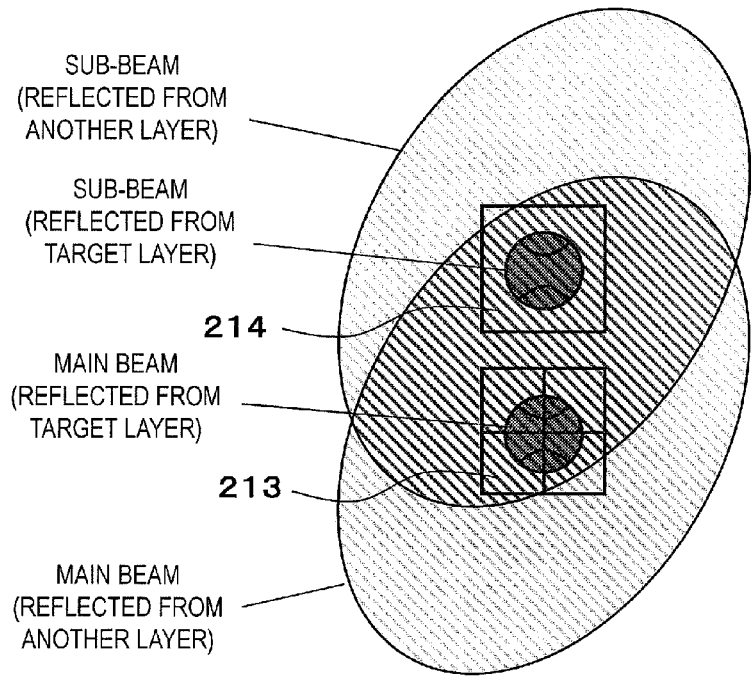
FIG. 26 illustrates another exemplary configuration for a photodetector according to the third embodiment.

According to this embodiment, the configuration shown in FIG. 24 may be replaced with the configuration shown in FIG. 26 in which only the light receiving elements 213 and 214 are provided to receive the reflected light beams that have left the main spot and the sub-spot. Even with such a configuration adopted, if the intensity of the main beam that has been reflected as stray light from another layer is measured in advance through a test write operation, the main beam stray light component can be removed from the output of the light receiving element 214 to receive the sub-beam.

Figure 27:
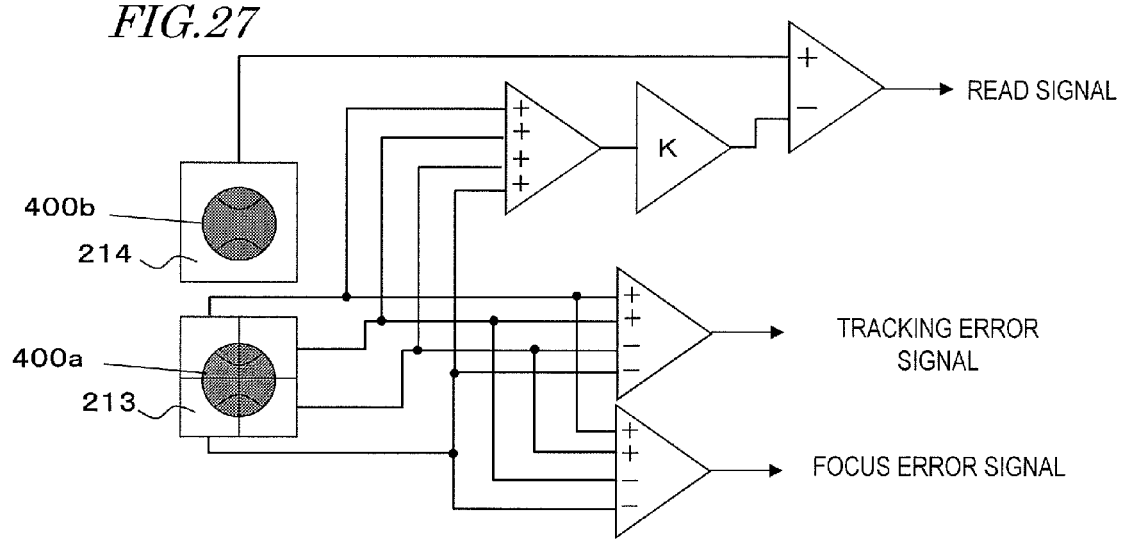
FIG. 27 illustrates a signal processing circuit configuration to adopt when the photodetector shown in FIG. 26 is used.

FIG. 27 illustrates an exemplary configuration for an arithmetic circuit for a photodetector 201 with such a configuration. As shown in FIG. 27, by subtracting a signal representing the output of the main light receiving element 213 multiplied by a coefficient K from the output of the sub-light receiving element 214, a read signal, which is hardly affected by the main beam that has been reflected as stray light from another layer, can be obtained. Hereinafter, an exemplary procedure of such arithmetic processing will be described.

Figure 28:
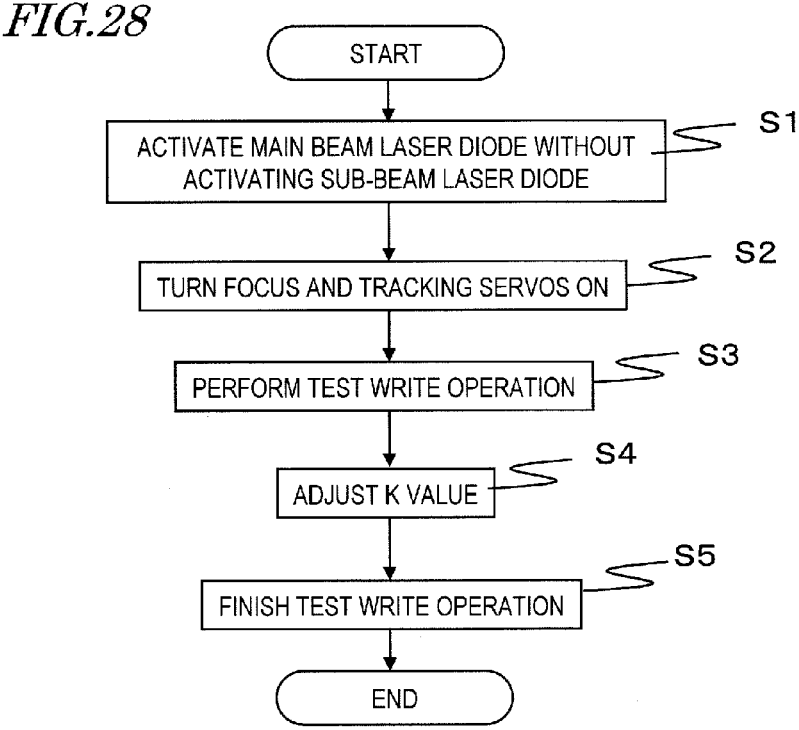
FIG. 28 is a flowchart showing how to exclude the influence of stray light that has come from another layer from the read signal in the third embodiment.

FIG. 28 is a flowchart showing how to exclude the influence of the main beam that has been reflected as stray light from another layer from the sub-beam signal in this exemplary configuration. First of all, before the DRAW is performed, only the main beam laser diode 210*a* is activated without activating the sub-beam laser diode 210*b* (in Step S1). Next, focus and tracking servos are turned ON to make the objective lens follow the optical storage medium 208 (in Step S2). In such a state, a test write operation is carried out (in Step S3). Any data may be written to perform the test write operation. During the test write operation, the light receiving element 213 receives the main beam that has been reflected from the target storage layer of the write operation and the main beam that has been reflected as stray light from another layer, while the light receiving element 214 receives only the main beam stray light from that another layer. In such a situation, the respective outputs of the light receiving elements 213 and 214 are detected and the amplification factor (K value) of the output of the light receiving element 213 is adjusted so that the read signal shown in FIG. 27 becomes approximately equal to zero (in Step S4). Once that adjustment has been made, the test write operation is finished (in Step S5). If the DARW operation is performed with the sub-beam laser diode 210*a* and the main beam laser diode 210*b* both activated after this flow has ended, a read signal of quality can be obtained with the influence of the main beam stray light from that another layer excluded.

(Embodiment 4)

Hereinafter, a fourth embodiment of the present invention will be described. This embodiment provides an optical pickup and optical read/write apparatus that can get the comparison and correlation operation done with stability by obtaining a good predicted waveform even if the time delay between the write modulated waveform and the read signal has varied when a DRAW operation is going to be performed on an optical storage medium with multiple storage layers. Although the optical pickup of this embodiment has the same configuration as its counterpart of the third embodiment, the system controller 905 of this embodiment performs a different series of processing from its counterpart of the third embodiment. Thus, the following description of this fourth embodiment will be focused on those differences from the third embodiment and their common features will not be described all over again to avoid redundancies.

Unlike the first embodiment in which multiple light beam spots are formed by splitting the light emitted from a single light source into multiple light beams through a light-splitting element such as a diffraction grating, the laser diodes 210*a* and 210*b* to form the main and sub-spots are independent of each other according to this embodiment. That is why the distance between the main and sub-spots 300*a* and 300*b* does not change due to a wavelength variation resulting from the temperature characteristic of the light source 210. However, to increase the reliability of the DARW operation, it is beneficial to actually measure the amount of delay between a point in time when data is read with the main spot 300*a* and a point in time when data is read with the sub-spot 300*b* before the DRAW operation is performed. That is why according to this embodiment, the system controller 905 is configured to measure the amount of delay between a signal representing the main beam and a signal representing the sub-beam and to perform the comparison and correlation operation based on the result of the measurement before the DRAW operation is performed.

Figure 29:
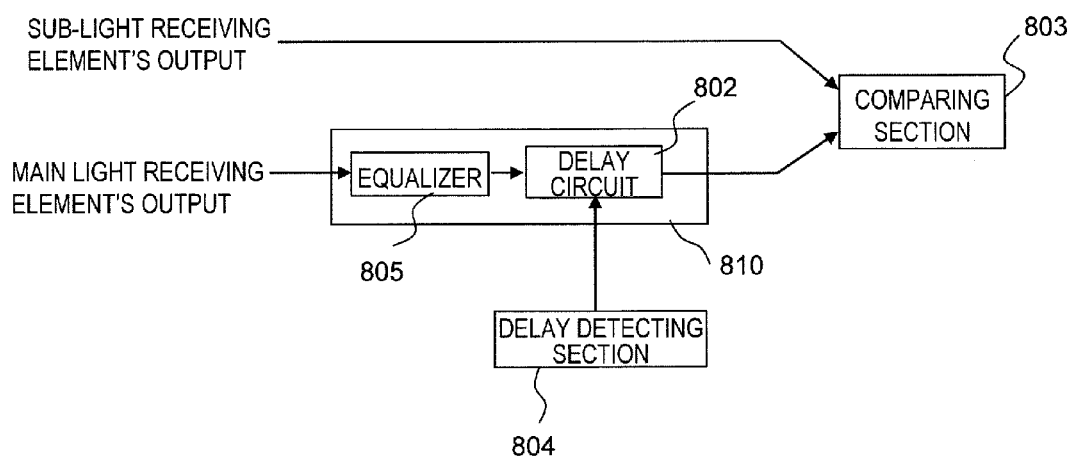
FIG. 29 is a block diagram illustrating an exemplary configuration for predicting and comparing a waveform according to a fourth embodiment of the present invention.

FIG. 29 illustrates functional blocks for measuring delays in the system controller 905 of this embodiment. The system controller 905 includes a waveform predicting section 810 that generates a predicted read waveform based on the output of the main light receiving element 213 using an equalizer 805 and a delay circuit 802, a comparing section 803 that compares the actual read waveform provided by the sub-light receiving element 214 to the predicted read waveform, and a delay detecting section 804 that adjusts the time delay caused by the delay circuit 802 that is included in the waveform predicting section 810.

Figure 30:
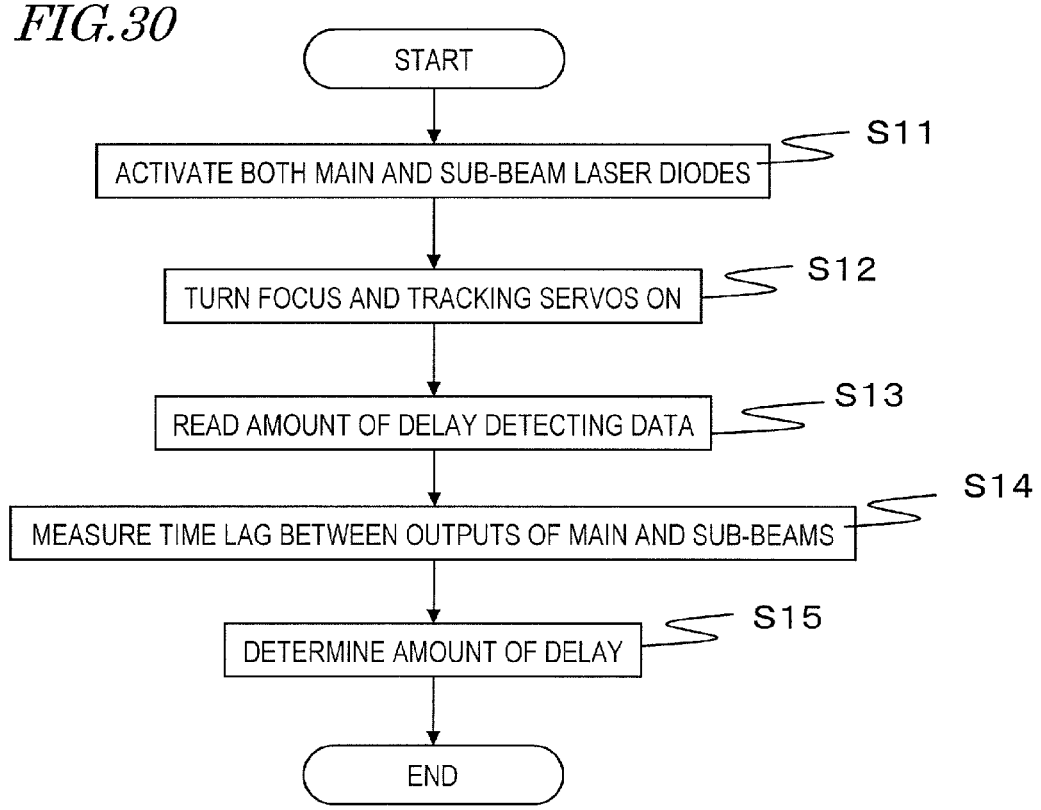
FIG. 30 is a flowchart showing an exemplary procedure of amount of delay measuring processing according to the fourth embodiment.

Hereinafter, it will be described what processing is performed by the waveform predicting section 810 and the delay detecting section 804 according to this embodiment. FIG. 30 is a flowchart showing the procedure of amount of delay measuring processing. On the optical storage medium 208, amount of delay detecting data (test data) is written in advance. In this case, the data to be written may be either the data to be generated when the optical storage medium 208 is made (e.g., address information) or the data that has been written in advance by the optical read/write apparatus of this embodiment. First of all, the light source is activated so as to emit a main beam and a sub-beam with read power (in Step S11). Next, the focus and tracking servos are turned ON to scan the optical storage medium 208 with a light beam spot (in Step S12). Subsequently, the area where the amount of delay detecting data is stored is scanned with a main beam and a sub-beam, thereby reading the amount of delay detecting data (in Step S13). Thereafter, the amount of delay between the respective outputs of the main and sub-light receiving elements 213 and 214 is detected and measured by the delay detecting section 804 of the system controller 905 (in Step S14). Thereafter, by reference to the table or function that is stored in advance in the nonvolatile memory 506, the delay detecting section 804 determines the amount of delay to be caused by the delay circuit 802 (in Step S15). By using this amount of delay when performing the DRAW operation, the system controller 905 can detect a read signal of quality.

The amount of delay detecting data may be set in an area to be read from, or written to, earlier than anywhere else on the optical storage medium 208 (such as a lead-in area on an optical disc). Alternatively, multiple sets of amount of delay detecting data may be set in a read/write area on the optical storage medium 208 so that the amount of delay can be detected regularly. Still alternatively, the amount of delay detecting data may be written in advance using the optical pickup of this embodiment itself and then the amount of delay may be detected between the main and sub-spots.

Figure 31:
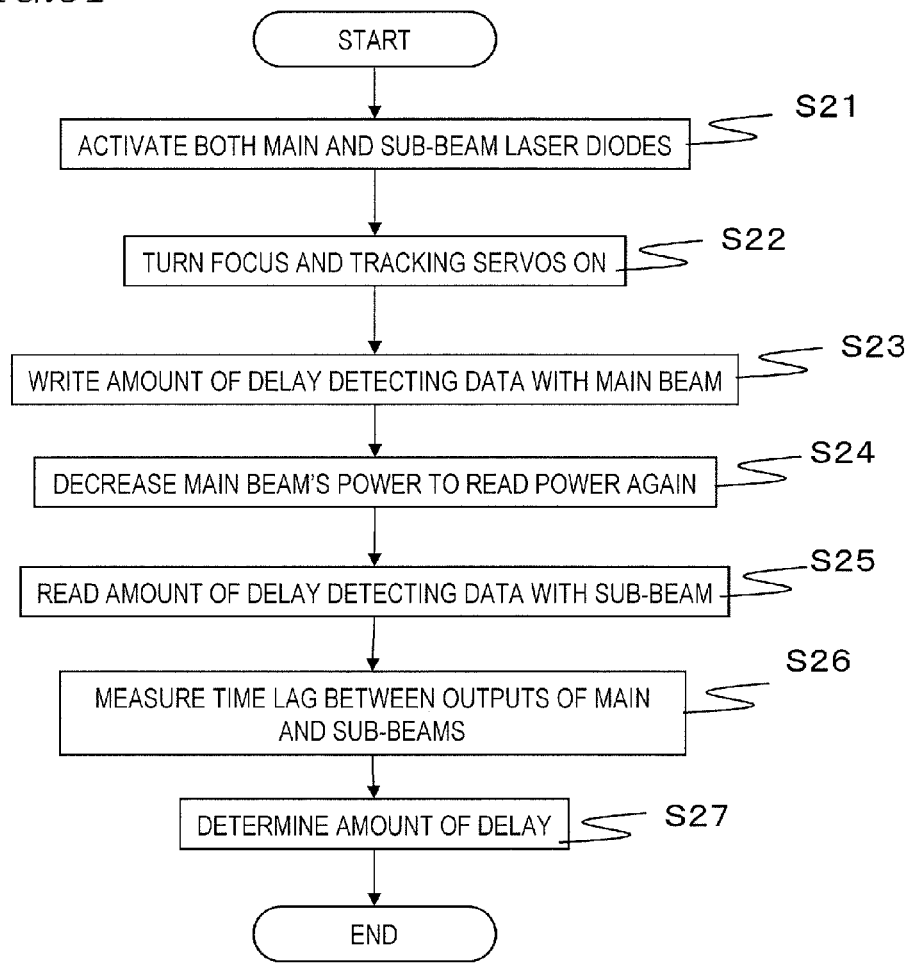
FIG. 31 is a flowchart showing another exemplary procedure of amount of delay measuring processing according to the fourth embodiment.

FIG. 31 is a flowchart showing another exemplary procedure of the amount of delay measuring processing. In this example, first of all, the light source is activated so as to emit main and sub-beams with read power (in Step S21). Next, the focus and tracking servos are turned ON to scan the optical storage medium 208 with a light beam spot (in Step S22). Subsequently, the output power of the main laser diode 210a is increased to emit a main beam with write power and the amount of delay detecting data is written with a main spot (in Step S23). After that, the optical power of the main beam is decreased to the read power again (in Step S24). In this process step, the quantity of the data to be written is set so that the write operation can be finished in a much shorter time than the amount of delay between the main and sub-spots. Subsequently, the amount of delay detecting data is read with a sub-beam (in Step S25). Thereafter, the amount of delay between the respective outputs of the main and sub-light receiving elements 213 and 214 is detected and measured by the delay detecting section 804 of the system controller 505 (in Step S26). Thereafter, based on the result of measurements, the delay detecting section 804 determines the amount of delay to be caused (in Step S27). To measure the amount of delay more accurately, this measuring process may be carried out a number of times. The measurements are carried out by the system controller 905 based on the number of times of measurement data that is stored in advance in the nonvolatile memory 506. By carrying out this flow, the amount of delay can be measured while data is being written, and when the data that has been written is read, the write operation can be stopped to avoid affecting the read signal. That is why the amount of delay measured can be kept accurate enough. By using the amount of delay measured to perform the DRAW operation, a read signal of good quality can be detected.

As described above, according to this embodiment, when a DRAW operation is performed on an optical storage medium 208 with multiple storage layers by using two light sources, the amount of delay between the main beam and sub-beam detection signals is detected. As a result, the read beam can be detected more accurately.

(Embodiment 5)

Hereinafter, a fifth embodiment of the present invention will be described. An optical read/write apparatus as a fifth embodiment of the present invention is an optical data streamer apparatus that uses an optical tape as an optical storage medium. Such an optical data streamer apparatus may be used to back up a huge quantity of data. In order to back up such an enormous quantity of data in a short time with the transfer rate increased, the optical data streamer apparatus includes a lot of optical pickups, each of which has the configuration and functions that have already been described for any of the first through fourth embodiments of the present invention.

Figure 32A:
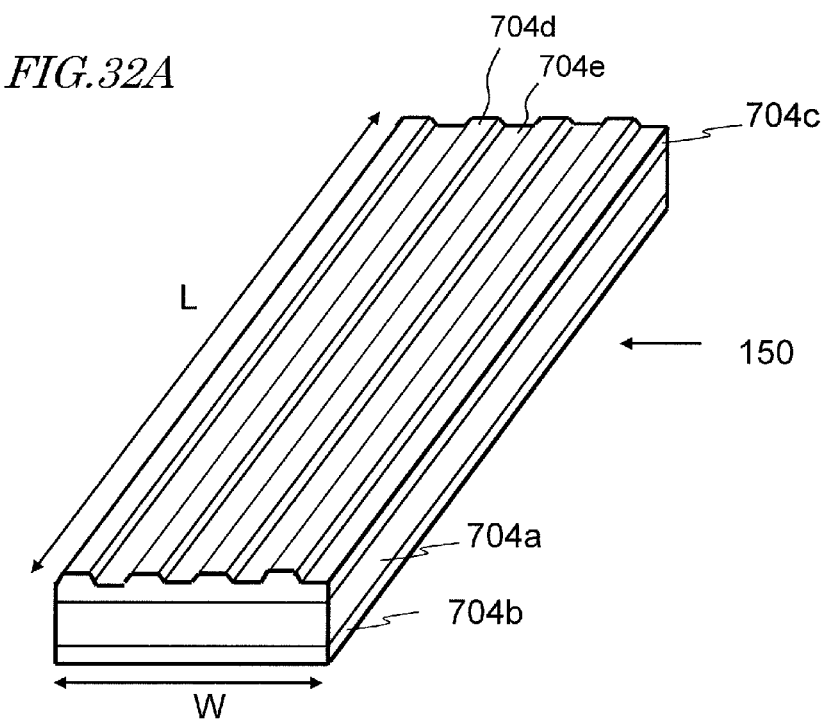
FIG. 32A is a perspective view schematically illustrating a portion of an optical tape 150 according to a fifth embodiment of the present invention on a larger scale.

FIG. 32A is a perspective view schematically illustrating a portion of an optical tape 150 on a larger scale. The optical tape 150 may include a base film 704a, a back coating layer 704b that is adhered to the back surface of the base film 704a, and an imprint layer 704c that is supported by the base film 704a. On the upper surface of the imprint layer 704c, lands 704d and grooves 704e have been formed. Although not shown in FIG. 32A, a reflective film and a recording material film are deposited over the entire upper surface of the imprint layer 704c. The optical tape 150 is extended in the longitudinal direction L and may have a length of several hundred meters, for example. Its width W may be set within the range of a few millimeters to several centimeters, and its thickness may be within the range of a few micrometers to several ten micrometers.

It should be noted that FIG. 32A illustrating the optical tape 150 is not to scale. Actually, the optical tape 150 may have several hundreds, or an even greater number, of lands 704d and grooves 704e. In one embodiment, data is written on either the lands 704d or the grooves 704e. The lands 704d or the grooves 704e on which data is written will be referred to herein as "tracks", which may have a pitch of 0.2 μm to 0.4 μm, for example.

Figure 32B:
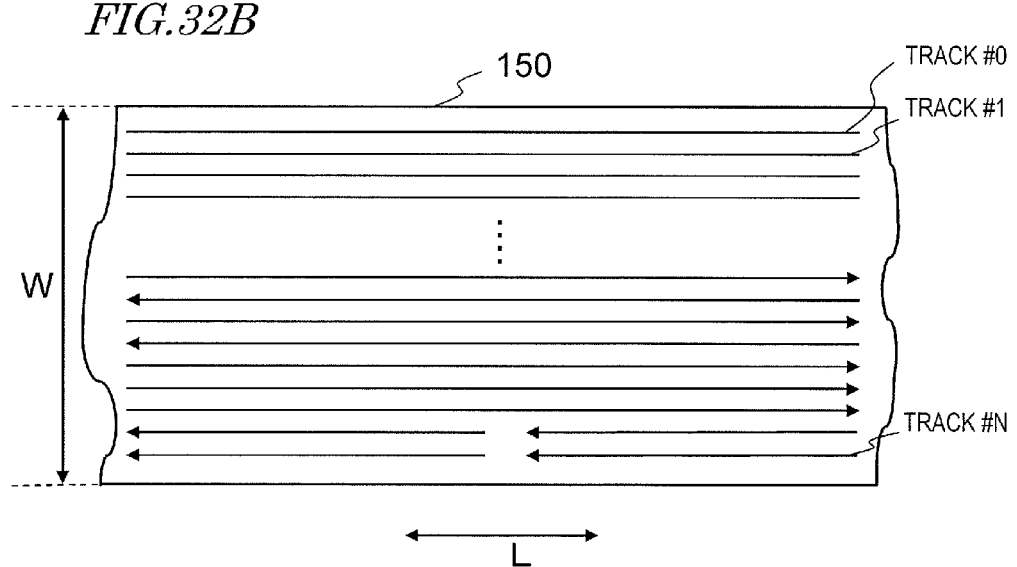
FIG. 32B is a plan view schematically illustrating a portion of the optical tape 150 according to the fifth embodiment.

FIG. 32B is a plan view schematically illustrating a portion of the optical tape 150. As shown in FIG. 32B, N (which is an integer that is typically equal to or greater than 100) tracks #0 through #N have been formed to run in the longitudinal direction L. Some of those tracks shown in FIG. 32B are illustrated with an arrow. Each of those arrows indicates the direction in which data is written. That is to say, data can be written in multiple different directions on a single optical tape 150.

Figure 33A:
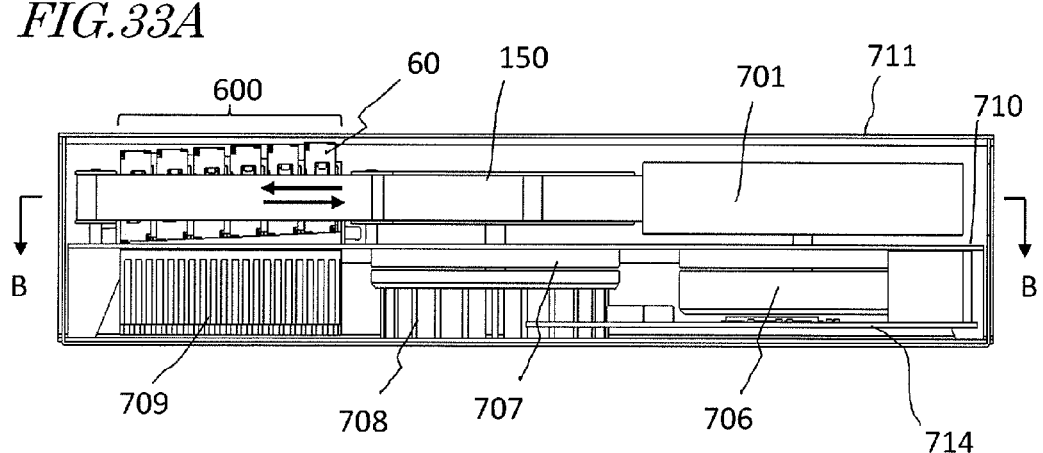
FIG. 33A illustrates an exemplary arrangement for an optical data streamer apparatus as the fifth embodiment.
Figure 33B:
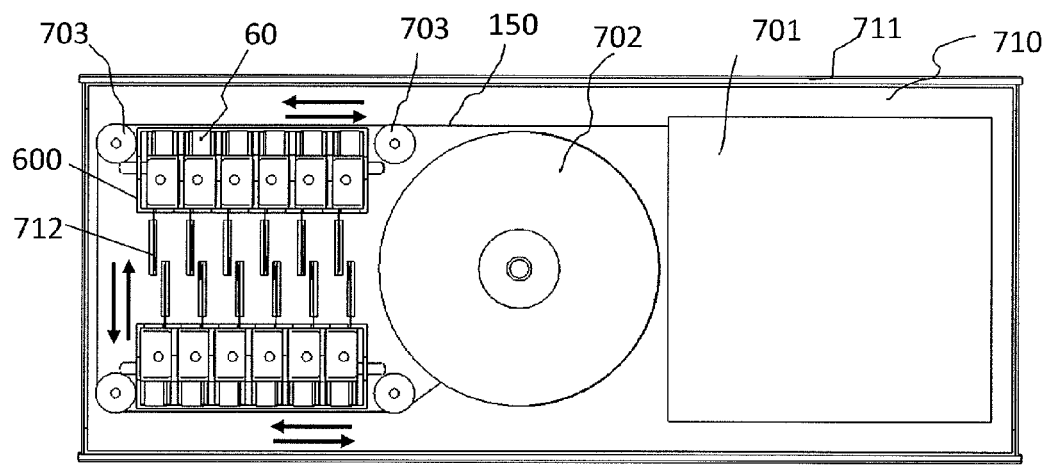
FIG. 33B is a cross-sectional view of the apparatus as viewed on the plane B-B shown in FIG. 33A.

FIG. 33A illustrates an exemplary arrangement for an optical data streamer apparatus as an embodiment of the present invention, and FIG. 33B is a cross-sectional view of the apparatus as viewed on the plane B-B shown in FIG. 33A. In the embodiment illustrated in FIG. 33A, the upside corresponds to perpendicularly upside, and the downside corresponds to perpendicularly downside. Thus, FIG. 33B illustrates an exemplary internal arrangement of this optical data streamer apparatus as viewed from right over the apparatus.

FIGS. 33A and 33B illustrate a situation where the apparatus is loaded with a tape cartridge 701 in which the optical tape 150 is housed. The tape cartridge 701 is readily attachable and removable to/from the apparatus. And the optical data streamer apparatus shown in FIGS. 33A and 33B is loaded with a selected one of multiple tape cartridges 701 that have the same shape.

The optical data streamer apparatus of this embodiment includes a housing 711, a chassis 710 that is arranged inside of the housing 711, a plurality of pickup parts 60 that are arranged so as to write data on the optical tape 150, and a radiator 709. Those pickup parts 60 are positioned by a positioning mechanism provided for an optical pickup assembly 600.

More specifically, this optical data streamer apparatus includes motors 706 and 707 that make the optical tape 150 run, guide posts 703 and a winding spool 702. The motor 707 is mechanically interlocked with the winding spool 702 and turns the winding spool 702. On the other hand, the motor 706 is mechanically interlocked with the shaft of the tape cartridge 701 loaded and operates so as to wind the tape 150, which has been pulled out of the tape cartridge 701, back to the tape cartridge 701. Using these two motors 706 and 707, the tape 150 can run in both of the two directions that are indicated by the arrows.

The optical pickup assembly 600 includes a number of pickup parts 60, which are arranged in the direction in which the optical tape 150 runs. The optical pickup assembly 600 of this embodiment has upper and lower arrays of pickup parts 60. In the housing 711, arranged is a blower fan 708 that is mechanically coupled to the motor 707. That is why as the motor 107 turns, the blower fan 708 turns, too.

Each pickup part 60 has a single or multiple optical pickups. Each optical pickup may have the configuration of any of the first through fourth embodiments described above. The pickup parts 60 are connected to flexible printed circuit boards (FPCs) 712 for optical pickups. This optical data streamer apparatus further includes a circuit board (not shown) that is connected to the flexible printed circuit boards 712 and that includes circuit components that control the pickup parts 60 and the motors 706 and 707. Optionally, the pickup parts 60 and a circuit that would normally be mounted on another circuit board could be partially arranged on the flexible printed circuit boards 712.

Hereinafter, an exemplary circuit configuration for an optical data streamer apparatus according to this embodiment will be described with reference to FIG. 34.

Figure 34:
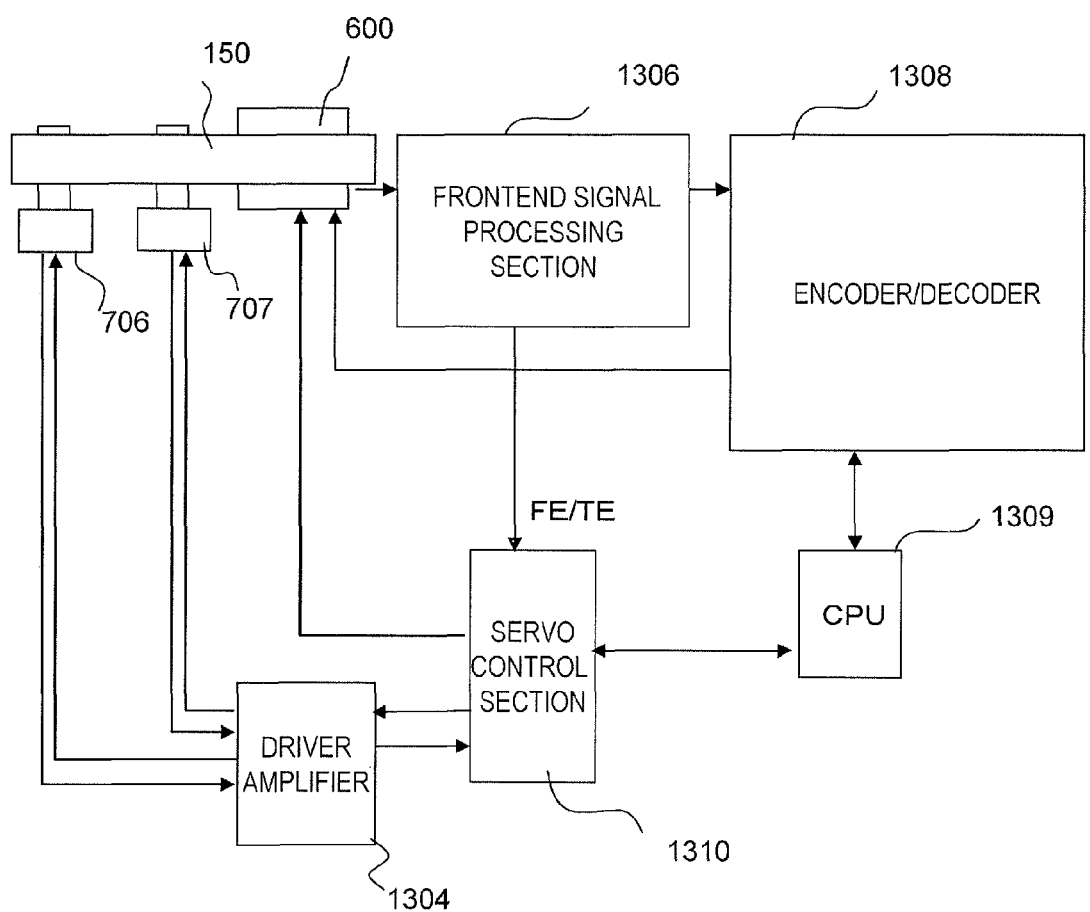
FIG. 34 illustrates an exemplary circuit configuration for an optical data streamer apparatus according to the fifth embodiment.

The optical data streamer apparatus illustrated in FIG. 34 includes circuit blocks that are electrically connected to the optical pickup assembly 600 and motors 706 and 707.

In the exemplary configuration shown in FIG. 34, the output of the optical pickup assembly 600 is supplied to an encoder/decoder 1308 by way of a frontend signal processing section 1306. In reading data, the encoder/decoder 1308 decodes the data that is stored on the optical tape 150 based on the signal that has been generated by the optical pickup assembly 600. In writing data, on the other hand, the encoder/decoder 1308 encodes the data to generate a signal to be written on the optical tape 150 and outputs the signal to the optical pickup assembly 600.

The frontend signal processing section 1306 generates a read signal based on the output of the optical pickup assembly 600, and also generates a focus error signal FE and a tracking error signal TE. The focus error signal FE and the tracking error signal TE are then supplied to a servo control section 1310.

In response, the servo control section 1310 gets the motors 706 and 707 controlled by a driver amplifier 1304. The servo control section 1310 also gets the position of an objective lens controlled by a lens actuator in the optical pickup assembly 600. The encoder/decoder 1308, the servo control section 1310 and all the other components are controlled by a CPU 1309. The blocks illustrated in FIG. 34 can be implemented by assembling together integrated circuit elements, memories and other electronic parts on a circuit board.

The frontend signal processing section 1306, the encoder/decoder 1308, the servo control section 1310, the driver amplifier 1304 and the CPU 1309 of this embodiment work together to perform the same function as what is carried out by the system controller of the first through fourth embodiments described above. Specifically, the processing including generating a read signal, comparing the waveforms, and controlling the time delay as described for the first through fourth embodiments is carried out by the frontend signal processing section 1306.

The information storage layer of the optical tape 150 that can be used in this embodiment may have a width of about 10 mm, for example. In that case, data can be read and written from/on the running optical tape 150 over the entire width of the information storage layer thereof by twenty-four optical pickups, for example.

Before the tape cartridge 701 is loaded into this optical data streamer apparatus, the optical tape 150 housed in the tape cartridge 701 has been wound around a spool (not shown). And when the tape cartridge 701 is loaded into the optical data streamer apparatus, the optical tape 150 is pulled out while being guided by a number of tape guide posts 703 and then wound around the winding spool 702. Each of the pickup parts 60 is fixed at a predetermined position with respect to the optical tape 150 so as to read and write information from/on the optical tape 150. In this embodiment, twenty-four optical pickups are provided, and therefore, data can be read and written simultaneously by using a maximum of twenty-four optical pickups. It should be noted that the number of optical pickups provided for a single optical data streamer apparatus does not have to be, and may be greater or smaller than, twenty-four.

The feed motor 707 drives and turns the winding spool 702, thereby running the optical tape 150 in the forward direction. At the same time, the feed motor 707 also drives the blower fan 708. On the other hand, the reverse motor 706 drives and turns a spool (not shown) in the tape cartridge 701, thereby running the optical tape 150 in the reverse direction. In the meantime, as the winding spool 702 is also driven by the optical tape 150, the blower fan 708 is turned, too. As the pickup parts 60 are thermally coupled to the radiator 709, the heat generated by the pickup parts 60 is transferred to the radiator 709.

During reading or writing, the optical tape 150 is run either in the forward direction by the feed motor 707 or in the reverse direction by the reverse motor 706, while those optical pickups can perform a read/write operation on the optical tape 150 at the same time.

With such a configuration, the optical data streamer apparatus of this embodiment can perform write and verify operations on the optical tape 150 in parallel by using multiple optical pickups. Furthermore, by using the optical pickups and signal processing of the first through fourth embodiments described above in combination, the quality of the signal for use to perform the verify operation can be improved. As a result, a bulk data storage system of quality, which can carry out a DRAW operation accurately while shortening the time it takes to perform a read/write operation, is realized.

While various embodiments of an optical read/write apparatus according to the present invention have been described as the first through fifth embodiments, it will be apparent to those skilled in the art that the disclosed invention may be modified in numerous ways and may assume many embodiments other than those specifically described above. Accordingly, it is intended by the appended claims to cover all modifications or combinations of the invention that fall within the true spirit and scope of the invention.

If an optical read/write apparatus according to an embodiment of the present invention is used in a bulk data storage system that includes a number of such apparatuses (e.g., a data file system that uses an optical tape or an optical disc), data can be written accurately either on multiple different areas of a given optical storage medium or on multiple different optical storage media in parallel with each other. Thus, the present invention provides a cost-effective read/write apparatus with a simplified configuration.

This application is based on Japanese Patent Applications No. 2011-222490 filed Oct. 7, 2011 and No. 2012-095007 filed Apr. 18, 2012, the entire contents of which are hereby incorporated by reference.

What is claimed is:

1. An optical read/write apparatus with the ability to write data on a track on an optical storage medium and read the data that has just been written on the track in parallel, the apparatus comprising:
    a light source;
    an optical modulator configured to provide the light source with a write modulation signal that modulates the emission power of the light source according to the data to be written;
    a light-splitting element configured to split a light beam emitted from the light source into multiple light beams including a write beam and a read beam;
    an optical system configured to converge the write and read beams onto the same track on the optical storage medium so that while a write operation is being performed, the same location on the optical storage medium is scanned with the write beam before being scanned with the read beam;
    a photodetector including a light receiving element configured to detect the read beam reflected from the optical storage medium and output an electrical signal;
    a waveform predicting section configured to generate a predicted read waveform by performing processing that includes the step of delaying either the waveform of the write modulation signal or a waveform representing the write modulated component of the light beam that has been modulated with the write modulation signal;
    a comparing section configured to compare a waveform based on the output of the light receiving element to the predicted read waveform, thereby determining whether or not the data has been written successfully; and
    a delay detecting section configured to detect the time delay of a waveform representing the output signal of the light receiving element with respect to either the waveform of the write modulation signal or the waveform representing the write modulated component of the light beam that has been modulated with the write modulation signal, thereby controlling the amount of delay caused by the waveform predicting section based on the time delay detected.

2. The optical read/write apparatus of claim 1, wherein the waveform predicting section includes an equalizer configured to output either the write modulation signal or the signal representing the write modulated component after having changed the signal's level and a delay circuit configured to delay the output of the equalizer, and
    wherein the delay detecting section varies the amount of delay caused by the delay circuit according to the time delay detected.

3. The optical read/write apparatus of claim 1, further comprising a temperature sensor,
    wherein the delay detecting section detects the time delay based on the output of the temperature sensor.

4. The optical read/write apparatus of claim 1, wherein the light receiving element is divided into at least two photosensitive areas that are arranged in a direction corresponding to the track direction of the optical storage medium, and
    wherein the delay detecting section detects the time delay based on a differential output between the two photosensitive areas.

5. The optical read/write apparatus of claim 1, wherein if the light receiving element is called a first light receiving element, the photodetector further includes a second light receiving element configured to output a signal representing the write modulated component of the light beam by detecting a part of the light beam that has been split by the light-splitting element and reflected from the optical storage medium, the second light receiving element being divided into at least two photosensitive areas that are arranged in the direction corresponding to the track direction of the optical storage medium, and
    wherein the delay detecting section detects the time delay based on a differential output between the two photosensitive areas.

6. The optical read/write apparatus of claim 1, wherein if the read beam is called a first read beam and if the light receiving element is called a first light receiving element, the light-splitting element splits the light beam emitted from the light source into multiple light beams including the write beam, the first read beam and a second read beam, and
    wherein the optical system is configured to converge the write beam and the first and second read beams onto the same track on the optical storage medium so that while a write operation is being performed, the same location on the optical storage medium is scanned with the write beam before being scanned with the first read beam and also scanned with the second read beam before being scanned with the write beam, and
    wherein the photodetector further includes second and third light receiving elements configured respectively to detect the second read beam and the write beam that have been reflected from the optical storage medium and then each output an electrical signal, and
    wherein the first light receiving element is divided into two or more photosensitive areas including at least first and second photosensitive areas, and
    wherein the second light receiving element is divided into two or more photosensitive areas including at least third and fourth photosensitive areas, and
    wherein the first photosensitive area, the second photosensitive area, the third light receiving element, the third photosensitive area and the fourth photosensitive area are arranged in this order in a direction corresponding to the track direction of the optical storage medium, and
    wherein the delay detecting section detects the time delay based on a differential signal between a signal representing the sum of the signals of the first and fourth photosensitive areas and a signal representing the sum of the signals of the second and third photosensitive areas.

7. The optical read/write apparatus of claim 1, wherein if test data to detect the amount of delay has been written on the optical storage medium,
    the delay detecting section detects the time delay based on a time lag between a signal representing the write beam reflected from an area where the test data is stored and a signal representing the read beam reflected from the area where the test data is stored.

8. The optical read/write apparatus of claim 7, further comprising a control section configured to instruct the optical modulator to write the test data on the optical storage medium with the write beam before the time delay is detected by the delay detecting section.

9. The optical read/write apparatus of claim 7, further comprising a control section configured to instruct the optical modulator not to emit the write beam with write power at a time when the test data is scanned with the read beam while the time delay is being detected by the delay detecting section.

* * * * *